US010938700B2

(12) United States Patent
Cohen et al.

(10) Patent No.: US 10,938,700 B2
(45) Date of Patent: Mar. 2, 2021

(54) RESOURCE ALLOCATION CONTROL BASED ON CONNECTED DEVICES

(71) Applicant: The Toronto-Dominion Bank, Toronto (CA)

(72) Inventors: Evan Cohen, Toronto (CA); Kevin Mari, Toronto (CA); Matthew Hamilton, Toronto (CA); Jonathan K. Barnett, Toronto (CA); Paul Mon-Wah Chan, Toronto (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 226 days.

(21) Appl. No.: 15/152,297

(22) Filed: May 11, 2016

(65) Prior Publication Data
US 2016/0337221 A1 Nov. 17, 2016

Related U.S. Application Data

(60) Provisional application No. 62/249,690, filed on Nov. 2, 2015, provisional application No. 62/160,074, filed
(Continued)

(51) Int. Cl.
*G06F 15/173* (2006.01)
*H04L 12/26* (2006.01)
(Continued)

(52) U.S. Cl.
CPC ........ *H04L 43/0876* (2013.01); *H04L 12/283* (2013.01); *H04L 41/0896* (2013.01);
(Continued)

(58) Field of Classification Search
CPC ............. H04L 43/0876; H04L 12/2803; H04L 12/283; H04L 41/0896; H04M 15/88
(Continued)

(56) References Cited

U.S. PATENT DOCUMENTS

| 6,956,500 B1 | 10/2005 | Ducharme et al. |
| 7,657,440 B2 | 2/2010 | Kuwata et al. |

(Continued)

FOREIGN PATENT DOCUMENTS

| WO | WO01/91073 A1 | 11/2001 |
| WO | WO2010099348 A1 | 9/2010 |
| WO | WO20140151121 A1 | 9/2014 |

OTHER PUBLICATIONS

Accenture, "The Bank of Things—How the Internet of Things will Transform Financial Services," copyright 2014, 12 pages.
(Continued)

*Primary Examiner* — Hannah S Wang
(74) *Attorney, Agent, or Firm* — Fish & Richardson P.C.

(57) ABSTRACT

The present disclosure involves systems and computer implemented methods for implementing a resource allocation. One example method is performed by identifying a resource allocation associated with the device hub, the resource allocation defining an expected resource usage associated with a connected device and a non-connected device. Resource usage information associated with the connected device is monitored, where usage information associated with the non-connected device is calculated based on a difference between a total resource usage identified by the device hub and the resource usage information associated with the connected device. The resource usage information is compared to the resource allocation, and in response to the comparison and a determination that the non-connected device exceeded the resource allocation associated with the non-connected device, an adjustment in operation for the connected device associated with the device hub is calculated. An instruction is transmitted to the connected device to perform the calculated adjustment.

19 Claims, 8 Drawing Sheets

Circuit Illustration

Related U.S. Application Data on May 12, 2015, provisional application No. 62/249,676, filed on Nov. 2, 2015.

(51) Int. Cl.

| | | |
|---|---|---|
| *H04M 15/00* | (2006.01) | |
| *H04L 12/24* | (2006.01) | |
| *H04L 12/28* | (2006.01) | |
| *H04L 12/911* | (2013.01) | |
| *H04L 29/08* | (2006.01) | |
| *H04W 24/08* | (2009.01) | |
| *H04W 4/70* | (2018.01) | |

(52) U.S. Cl.
CPC ............. *H04L 47/70* (2013.01); *H04L 67/10* (2013.01); *H04M 15/88* (2013.01); *H04W 4/70* (2018.02); *H04W 24/08* (2013.01)

(58) Field of Classification Search
USPC ........................................................ 709/226
See application file for complete search history.

(56) References Cited

U.S. PATENT DOCUMENTS

| | | | |
|---|---|---|---|
| 8,140,414 B2 | 3/2012 | O'Neil et al. | |
| 8,275,698 B2 | 9/2012 | Boss et al. | |
| 8,566,227 B2 | 10/2013 | Carroll et al. | |
| 10,024,564 B2 | 7/2018 | Frank et al. | |
| 2001/0032109 A1 | 10/2001 | Gonyea et al. | |
| 2001/0049618 A1 | 12/2001 | Patzel et al. | |
| 2002/0005668 A1* | 1/2002 | Couture ................... | H02G 7/00 307/98 |
| 2003/0055766 A1 | 3/2003 | Blanchard et al. | |
| 2004/0177705 A1* | 9/2004 | Donat .................... | B25J 9/1602 73/862.27 |
| 2005/0143865 A1* | 6/2005 | Gardner .................... | H02J 3/14 700/291 |
| 2006/0155904 A1 | 7/2006 | Murakami | |
| 2007/0124606 A1* | 5/2007 | Hsieh .................... | G06F 1/3215 713/300 |
| 2007/0203860 A1 | 8/2007 | Golden et al. | |
| 2008/0096524 A1 | 4/2008 | True et al. | |
| 2011/0046805 A1 | 2/2011 | Bedros et al. | |
| 2011/0218703 A1 | 9/2011 | Uchida | |
| 2011/0307141 A1 | 12/2011 | Westerlage et al. | |
| 2012/0078781 A1 | 3/2012 | Ross | |
| 2012/0191602 A1 | 7/2012 | Wright et al. | |
| 2012/0239595 A1 | 9/2012 | Kiuchi et al. | |
| 2012/0306882 A1* | 12/2012 | Kashiwagi ............... | G01D 4/00 345/440 |
| 2012/0323385 A1 | 12/2012 | Thiruvengada et al. | |
| 2013/0013936 A1* | 1/2013 | Lin .......................... | G06F 1/266 713/300 |
| 2013/0030994 A1 | 1/2013 | Calman et al. | |
| 2013/0185437 A1* | 7/2013 | Willig ................... | H04L 67/125 709/226 |
| 2013/0207702 A1 | 11/2013 | Pal et al. | |
| 2013/0346302 A1 | 12/2013 | Purves et al. | |
| 2014/0006329 A1 | 1/2014 | Hu et al. | |
| 2014/0180847 A1 | 6/2014 | Silverstein et al. | |
| 2014/0244017 A1 | 8/2014 | Freiwirth et al. | |
| 2014/0244834 A1 | 8/2014 | Guedalia et al. | |
| 2015/0095478 A1 | 4/2015 | Zuerner | |
| 2016/0147205 A1* | 5/2016 | Kaufman ............. | G05B 13/048 700/29 |
| 2016/0170428 A1* | 6/2016 | Ichien .................... | G06Q 50/16 700/297 |
| 2017/0124541 A1 | 5/2017 | Aggarwal | |
| 2019/0334805 A1 | 10/2019 | Cohen et al. | |

OTHER PUBLICATIONS

Hartman et al., "Smart Meters, Big Data, and Customer Engagement: In Pursuit of the Perfect Portal," Copyright 2014, 11 pages.
LTP Let's Talk Payments, "How to Integrate Payments in IoT Devices?," May 27, 2015, 5 pages.
VUB—Visual Utility Billing, "Power Utility Billing Software Streamlines Your Work," Copyright 2015, 1 page.
Wentzlaff, "The Decision Maker Internet of Things: Retail Banking (Bank of Things)," Feb. 3, 2015, 7 pages.
Pye, "The Internet of Things connecting the unconnected," Engineering & Technology, Dec. 2014, 5 pages.
Kwan et al, "Wireless Sensors with Advanced Detection and Prognostic Capabilities for Corrosion Health Management," Advanced Materials Research, vol. 38, pp. 123-131.
Liebman; Jeffrey et al., "Do Expiring Budgets Lead to Wasteful Year-End Spending?" Evidence from Federal Procurement, Sep. 2013, National Bureau of Economic Research (Year: 2013).

* cited by examiner

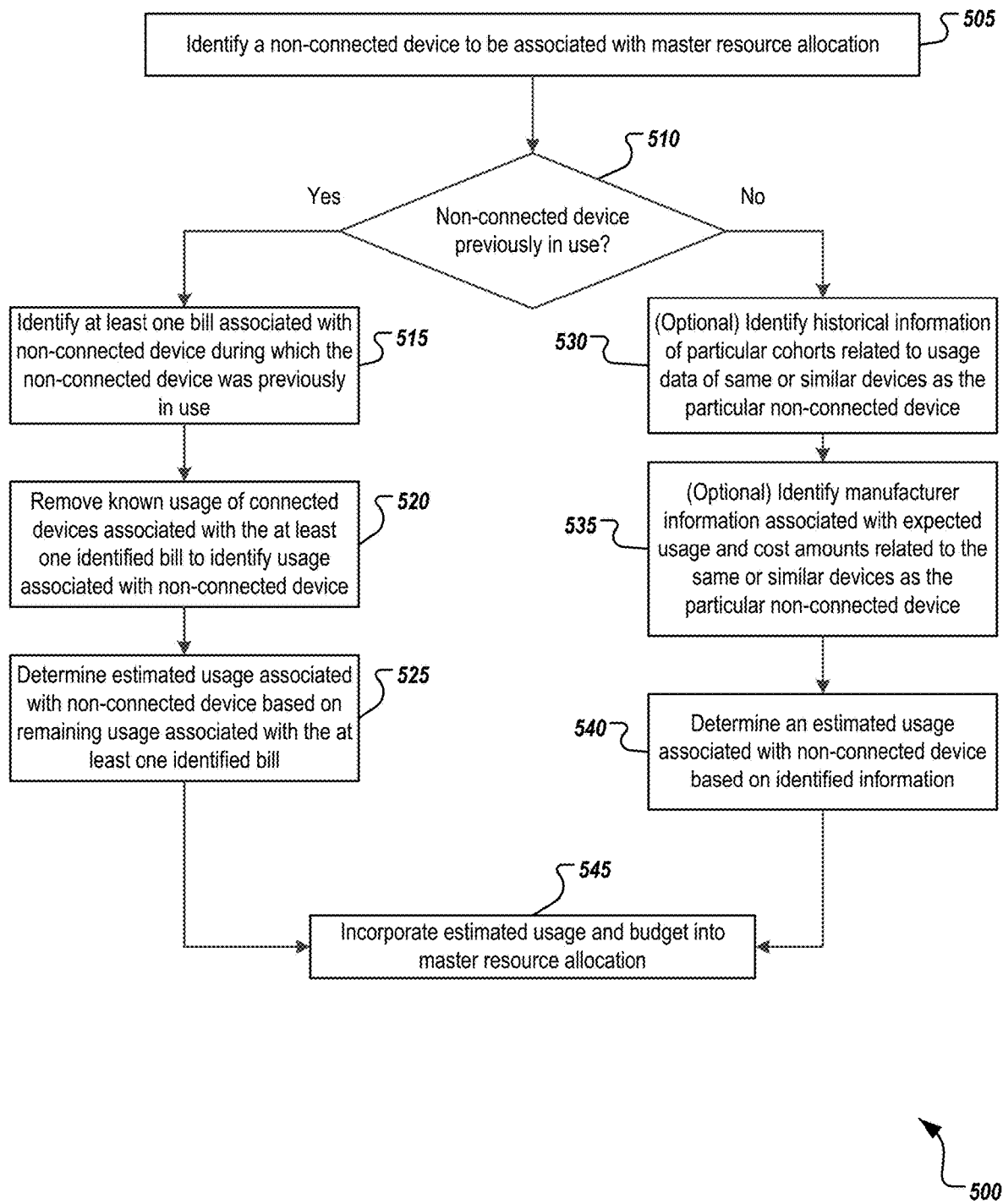
FIG. 5 – Adding Non-Connected Device to Budget

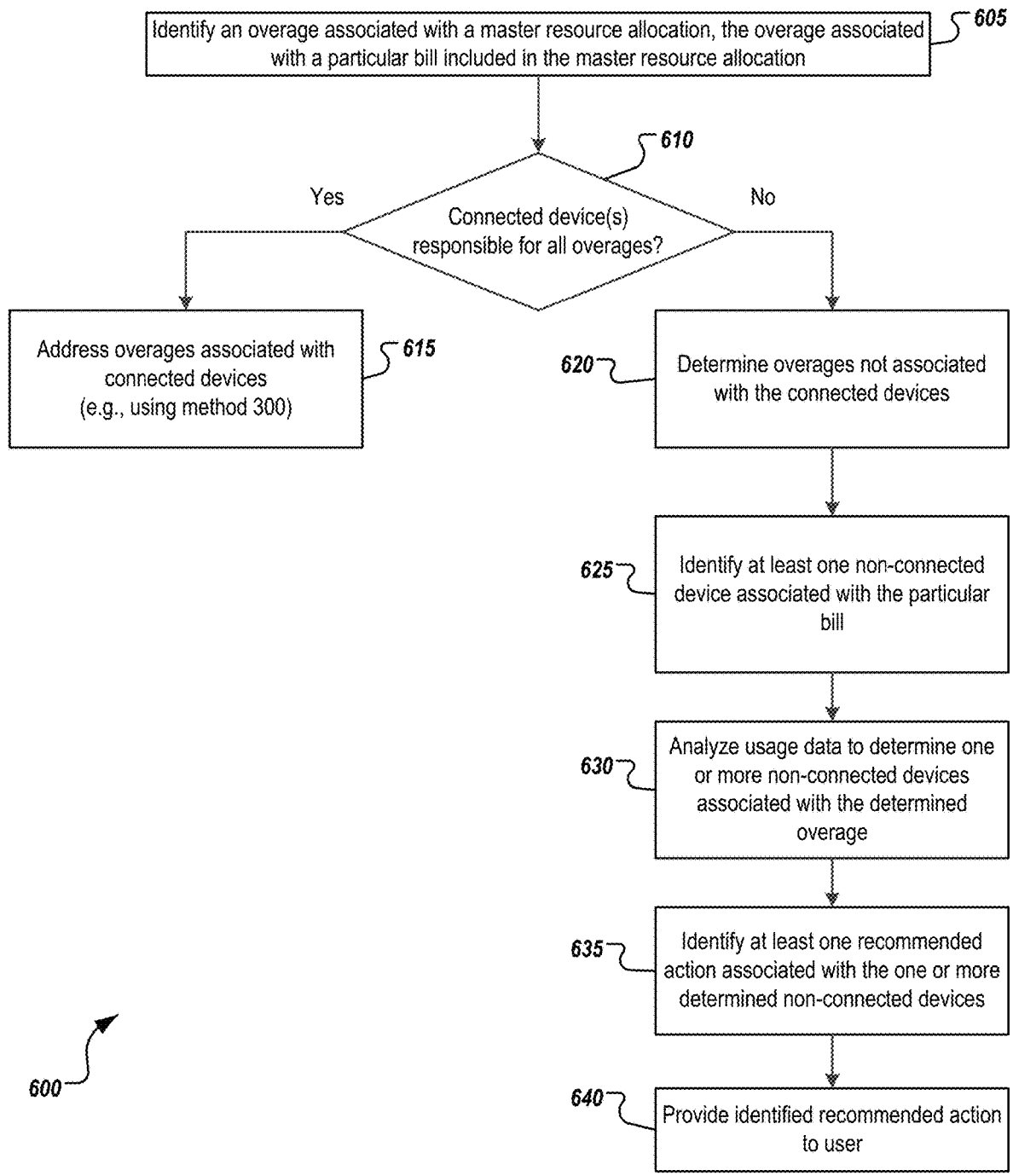
FIG. 6 – Detecting Overage Associated with Non-Connected Device

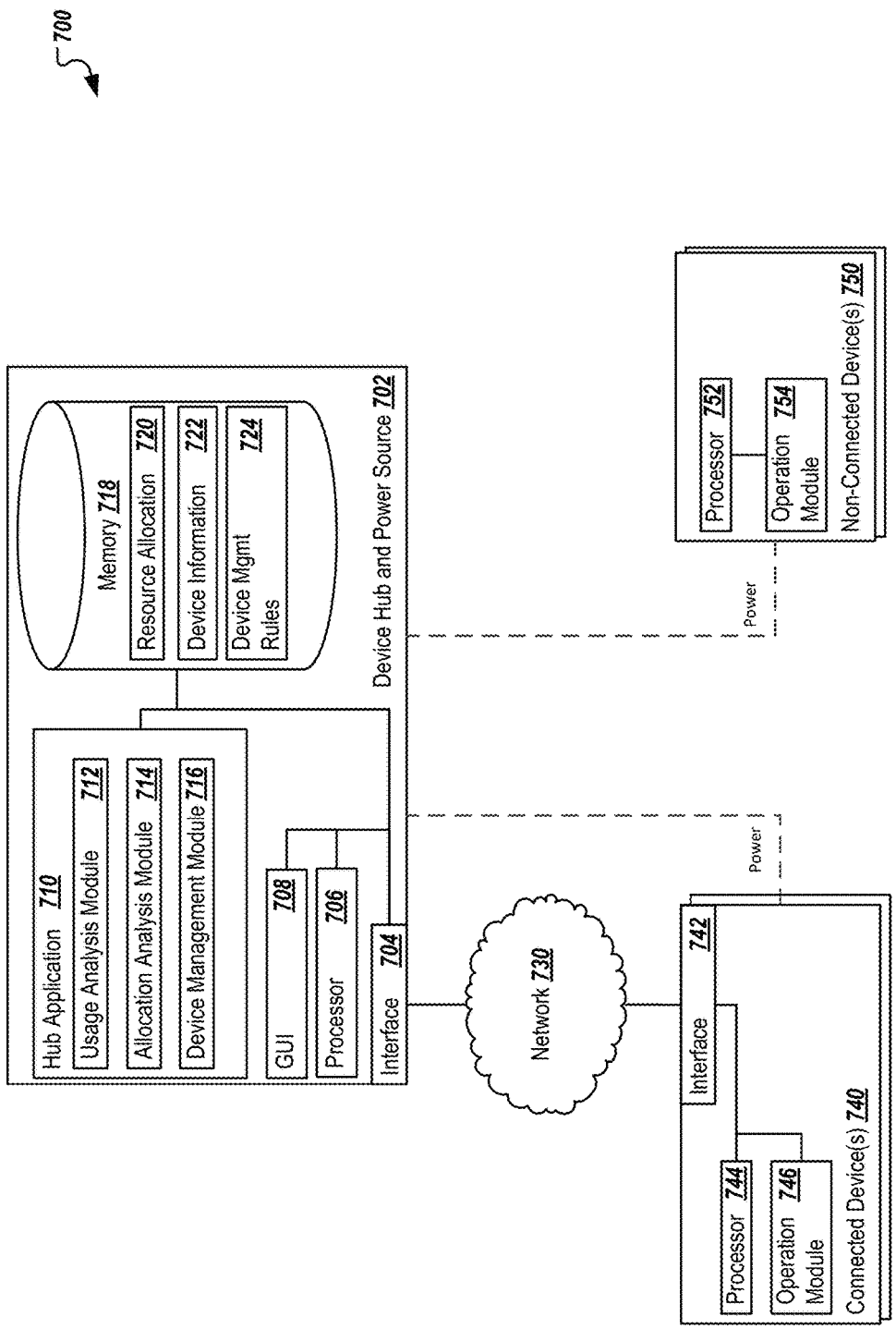
FIG. 7 – Circuit Illustration

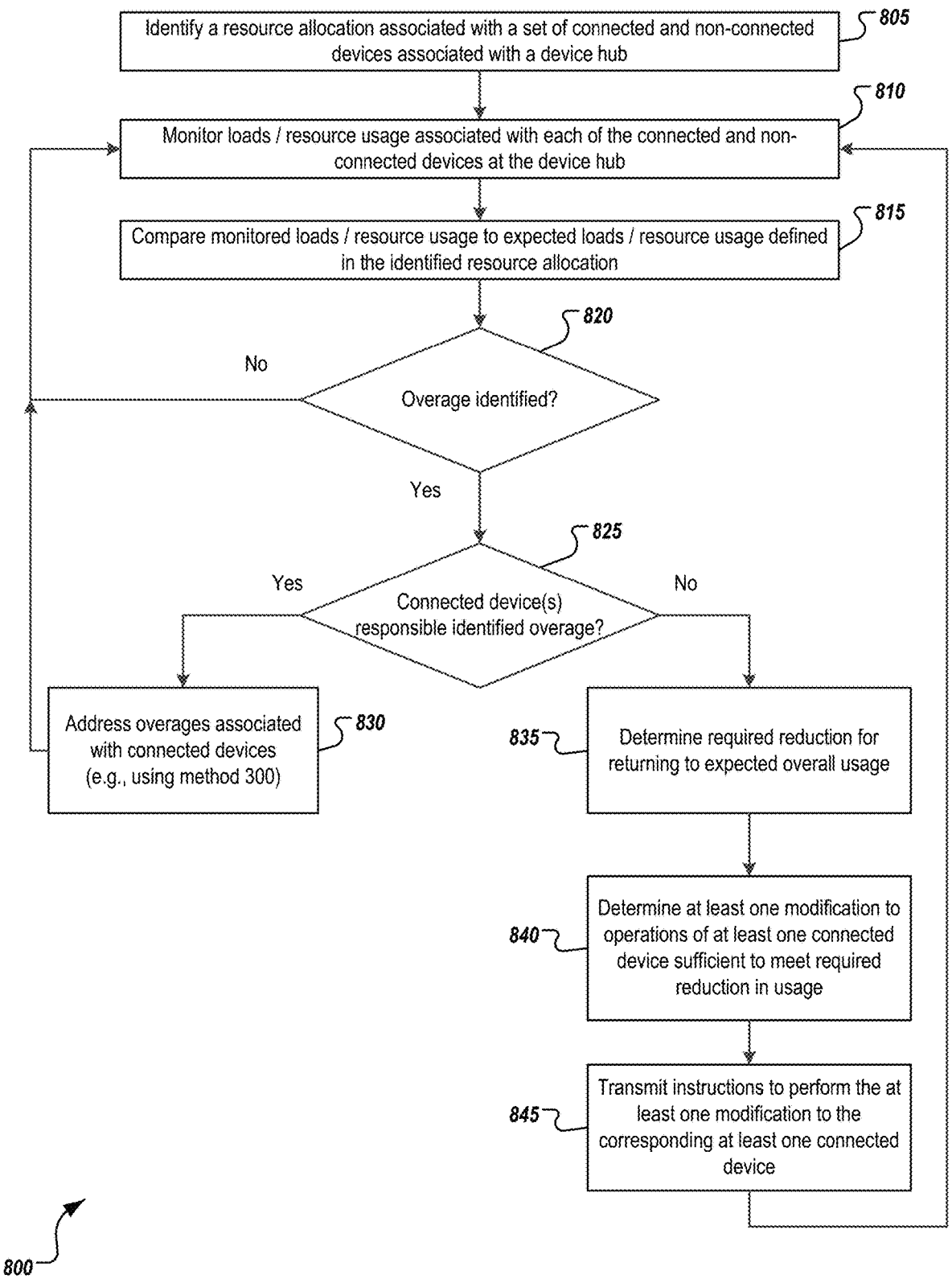
FIG. 8 – Single Circuit with Connected and Non-Connected Devices

… (1)

RESOURCE ALLOCATION CONTROL BASED ON CONNECTED DEVICES

CROSS-REFERENCE TO RELATED APPLICATIONS

This application claims the benefit of priority to U.S. Provisional Application Ser. No. 62/249,690, filed on Nov. 2, 2015, U.S. Provisional Application Ser. No. 62/249,676, filed on Nov. 2, 2015, and U.S. Provisional Application Ser. No. 62/160,074, filed on May 12, 2015, the entire contents of which are hereby incorporated by reference. This application is also related to U.S. patent application Ser. No. 15/152,296, filed on May 11, 2016, and U.S. patent application Ser. No. 15/152,286, filed on May 11, 2016, the contents of each are hereby incorporated by reference.

TECHNICAL FIELD

The present disclosure relates to computer systems and computer-implemented methods for implementing a resource allocation and adjusting resource usage based on information received from a plurality of network-connected devices.

The network of connected devices can include a network of physical objects, or "things," embedded within electronics, software, sensors, and connectivity to enable and achieve greater value and service by exchanging data with the manufacturer, operator, and/or other connected devices or systems. Each thing can be uniquely identifiable through its embedded computing system, and can interoperate through the existing Internet or local network infrastructure. In many cases, implementations of the network can provide services including machine-to-machine communications (M2M), such that information received from one machine can influence or modify the actions and activities of other machines.

SUMMARY

The present disclosure involves systems and computer implemented methods for implementing a resource allocation One example method is performed by identifying a resource allocation associated with the device hub, the resource allocation defining an expected resource usage associated with a connected device and a non-connected device. Resource usage information associated with the connected device is monitored, where usage information associated with the non-connected device is calculated based on a difference between a total resource usage identified by the device hub and the resource usage information associated with the connected device. The resource usage information is compared to the resource allocation, and in response to the comparison and a determination that the non-connected device exceeded the resource allocation associated with the non-connected device, an adjustment in operation for the connected device associated with the device hub is calculated. An instruction is transmitted to the connected device to perform the calculated adjustment.

In some instances, the device hub is a relay for, a provider of, or gateway to a resource. In other instances, the device hub may be a power outlet or surge protector. The resource may be electrical power.

In some instances, the determination that the non-connected device exceeded the resource allocation associated with the non-connected device may include a determination that two or more non-connected devices associated with the device hub exceeded the resource allocation associated with the two or more non-connected devices.

In some instances, the instruction to perform the calculated adjustment in operation is performed at the connected device automatically without intervention from another party.

In some instances, calculating the adjustment in operation for the connected device associated with the device hub includes determining a reduction in resource usage required to reduce overall resource usage to the expected resource usage included in the resource allocation and determining at least one adjustment operable to cause a change in the overall resource usage equal to or exceeding the determined reduction. The at least one determined adjustment may include adjustments in operations for two or more connected devices.

In some instances, the resource allocation may include a subset of a master resource allocation associated with a larger ecosystem of connected and non-connected devices. In some instances, in response to the comparison and a determination that the monitored resource usage associated with the connected device exceeds the resource allocation for the connected device, the method may further include calculating an adjustment in operation for the connected device associated with the exceeded usage or a different connected device not associated with the overage and associated with the device hub While generally described as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 is a flowchart of an example operation for adding a non-connected device into a master resource allocation.

FIG. 6 is a flowchart of an example operation for using a master resource allocation to determine an overage associated with at least one non-connected device.

FIG. 7 is a flowchart of an example operation for using a connected controller to identify an overage associated with at least one non-connected device and modifying operations of a connected device in response.

FIG. 8 is a flowchart of an example operation for using a connected controller to monitor resource usage of both connected and non-connected devices, and, in response to identifying resource usage exceeding an expected amount for a non-connected device, adjusting operations of at least one connected device.

DETAILED DESCRIPTION

Figure 1:
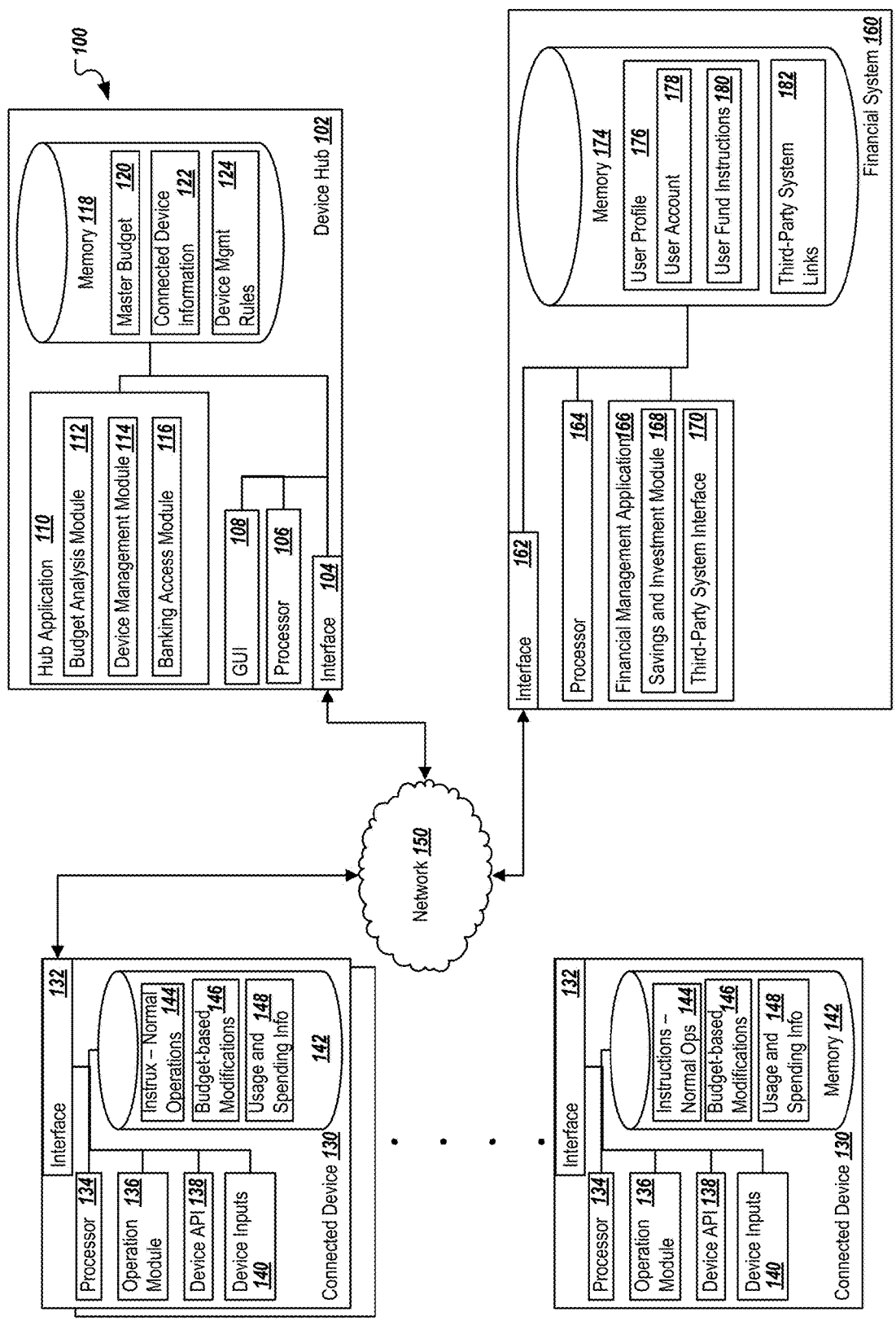
FIG. 1 is a block diagram illustrating an example system for implementing and managing a resource allocation, including adjusting disbursement of the resource allocation based on information received from a plurality of network-connected devices.

The present disclosure describes systems and methods for implementing a resource allocation and adjusting resource usage and corresponding spending based on information received from a plurality of network-connected devices and the consumption pattern of non-connected devices. Specifically, a centralized network hub or hub module and managed resource allocation allow "smart" devices to be used in a home, office, or other location to manage spending, modify device operations, and save and/or invest the amount saved through use of the disclosed budgeting processes.

Advancements in home automation and network-connected devices are leading to new interactions and strategies for managing devices and costs associated with them, such as power consumption. The present disclosure and the tools described herein seek to combine a household or business's resource allocation with network-connected devices to drive device actions within financial constraints. In some instances, users can grant various permission levels for autonomous or semi-autonomous operations that allow modifications to be made to a first device in light of power consumption or usage of a different, second device. Additionally, device interactions can be used to drive budget parameters and projections.

In the present solution, the master resource allocation, or budget, is used as a master controller for multiple network-connected devices. In some instances, the master budget and the various interactions can be managed from a network hub device, such as a smartphone, tablet, personal computer, or other similar components. In other instances, a centralized or cloud-based solution can be used. In any instance, component usage and/or spend data can be collected and compared to the master budget. In response to the comparison, different types of budgetary and device actions can be determined and taken. These tools allow previously unrelated and disconnected network-connected devices to be aligned towards a common goal, the financial budget of the household or business. In some instances, the network hub device may be a part of, embedded within, or otherwise implemented or operated within a particular connected device being monitored. Alternatively, the hub device may be separate from and external to any particular connected device.

Further, in some instances, a more granular analysis may be performed, such as when a particular controller manages a subset of a full resource allocation. The particular controller may be a smart meter (e.g., a smart water meter, smart gas meter, smart electrical meter) used to identify particular loads upon one or more resources (e.g., water usage, gas usage, or electrical usage). In such instances, loads may include an electrical load (for an electrical circuit), a load flow related to water resources being used/provided, or a gas flow of natural gas, propane, or another gas, as well as any other suitable loads. Still further, particular circuits, electrical outlets, surge protectors, and other devices (referred to as "circuits") may manage one or more devices or components (e.g., a connected fan, a computer, a printer, etc.). In some instances, these circuits can manage a known set of devices with understood or expected loads based on corresponding resource allocations. As the circuits monitor the loads of the different devices connected to or through the circuit, a determination on a more granular level can be made as to the amount of load and corresponding usage associated with particular devices connected to the circuit and the load of a non-connected device. As one or more of the devices connected to the circuit exceed their expected load/resource usage, the circuit can then instruct one or more of the devices connected to the circuit to modify their usage or change the load allowed to be used by the devices. In some instances, one or more of the devices connected to the circuit may be non-connected, in that instructions to modify the operations of said non-connected devices (which are actually connected to the circuit) cannot be provided. When the expected load to the circuit exceeds an expected amount associated with a resource allocation of the devices connected to the circuit, the smart circuit can determine if the increased load is caused by a connected, or smart, device. If so, modifications to the operations of the connected device or another connected device can be modified. However, if the increased load is not caused by one of the smart connected devices, but is instead determined to be caused by one of the dumb devices connected to the circuit, the circuit can determine one or more potential operational modifications to be performed by one of the smart connected devices to move the full load on the circuit back to within the expected amount. Further description of such a situation can be found below.

Additionally, financial objectives could be modified via manual interactions with particular network-connected devices based on suggestions originating from the master resource allocation. For example, a message stating "Agreeing to reduce the temperature by 3 degrees permanently will save $3000 towards your retirement" could be displayed on the thermostat or at a user device, including the network hub. In response to a manual agreement to the change, the master resource allocation and the operational parameters of the particular network-connected device can be modified to reflect the change. In essence, the master resource allocation can become a governor of the operations of a plurality of network-connected devices. The user can set particular parameters into the master resource allocation, such as preventing the thermostat to be set less than 65 degrees and no higher than 75 degrees. Further, additional data sources (e.g., additional sensors, third-party input, and other information) can be used to enhance the master resource allocation and operational parameters, such as identifying warmer weather and allowing the thermostat to rely less on the heater by setting the lower end of allowable temperatures to a higher level and/or changing the scheduled heating schedule of the thermostat. Still further, devices outside of the home or office (e.g., wearables, vehicles, etc.) can be used in an extended implementation.

Turning to the illustrated embodiment, FIG. 1 is a block diagram illustrating an example system 100 implementing a resource allocation, referred to herein as the master budget, and adjusting spending via modified connected device operations based on information received from a plurality of network-connected devices. As illustrated in FIG. 1, system 100 is a client-server and device-client system capable of sharing device information across a set of connected devices 130 to a device hub 102, where both the device hub 102 and connected devices 130 may interact with a financial system 160. Specifically, system 100 includes or is communicably coupled with the financial system 160, device hub 102, a plurality of connected devices 130, and network 150. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, financial system 160 may be any computer or processing device such as, for example, a blade server, general-purpose personal computer (PC), Mac®, workstation, UNIX-based workstation, or any other suitable device. Moreover, although FIG. 1 illustrates a financial system 160, financial system 160 can be implemented using two or more systems, as well as computers other than servers, including a server pool. In other words, the present disclosure contemplates computers other than general purpose computers, as well as computers without conventional operating systems. Similarly, each of the connected devices 130 may be considered computers, including functionality and operations specific to the individual device (e.g., a thermostat, security system, water heater, etc.), while the device hub 102 may be a smartphone, tablet, laptop computer, or any other suitable device. Further, illustrated financial system 160, device hub 102, and the plurality of connected devices 130 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the device hub 102 is used to manage, interact with, and otherwise maintain the plurality of connected devices 130 while interacting with the financial system 160 in light of collected data throughout the system. The device hub 102 as illustrated in FIG. 1 contemplates a mobile device, although the device hub 102 may be a relatively stationary device (e.g., a desktop computer), or may be a client for a web- or cloud-based application. The device hub 102 can perform many of the operations directly at the device, while some operations may be performed remotely. The device hub 102 may be a dedicated device associated with the master budget, while in other instances, the device hub 102 may be considered the device hub 102 due to a particular hub application 110 being executed at the device hub 102 that is used to intelligently manage the connected devices 130 and the master budget 120.

As illustrated, the device hub 102 includes an interface 104, a processor 106, a hub application 110, and memory 118. In general, the device hub 102 is a simplified representation of one or more devices that allow a plurality of network-connected devices 130 to be managed in light of a master budget 120. The device hub 102 may connect directly to the other connected devices 130 via a wireless or wired technology (e.g., via network 150, Bluetooth, Near-Field Communications (NFC), etc.), or the device hub 102 may contact one or more application programming interfaces (APIs) associated with one or more of the connected devices 130. In those instances, particular connected devices 130 may send information associated with their operation to another system, location, or service. The hub device 102, through its functionality, can then connect to those other systems, locations, or services to receive and identify usage and operational information regarding those connected devices. Similarly, the device hub 102 can provide instructions to the connected devices 130 either directly via network 150 or through the intermediate connections as described. In some instances, the device hub 102 may also be a connected device 130 such that the device hub 102's operations are considered and used in interacting with and managing the master budget 120

The interface 104 is used by the device hub 102 for communicating with other systems in a distributed environment—including within the environment 100—connected to the network 150, e.g., connected devices 130 and/or financial system 160, and other systems communicably coupled to the network 150. Generally, the interface 104 comprises logic encoded in software and/or hardware in a suitable combination and operable to communicate with the network 150. More specifically, the interface 104 may comprise software supporting one or more communication protocols associated with communications such that the network 150 or interface's hardware is operable to communicate physical signals within and outside of the illustrated environment 100. Still further, the interface 104 may allow the device hub 102 to create ad hoc or dedicated connections to one or more of the connected devices 130.

As illustrated in FIG. 1, the device hub 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the device hub 102. Specifically, the processor 106 executes the algorithms and operations described in the illustrated figures, including the operations performing the functionality associated with the device hub 102 generally, as well as the various software modules (e.g., the hub application 110), including the functionality for sending communications to and receiving transmissions from the connected devices 130 and the financial system 160.

The illustrated device hub 102 also includes memory 118, or multiple memories 118. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the device hub 102. Additionally, the memory 118 may store any other appropriate data, such as VPN applications, firmware logs and policies, firewall policies, a security or access log, print or other reporting files, as well as others. For example, memory 118 can store the master budget 120, connected device information 122, and device management rules 124.

The master budget 120 represents a defined budget used to actively manage the operations of a plurality of connected devices 130 in such a way as to maintain budgetary requirements through operational modifications to one or more of the connected devices 130 in response to usage information associated with at least one of the connected devices 130. The master budget 120 may be a user-defined budget, an automatically-defined budget based on usage history or a default usage amount, or a combination thereof. The master budget 120 may be updated after continued usage of the tools described herein, such that auto- and/or manual-adjustments can be made, as appropriate. In one example, the master budget 120 can define a monthly budget for home operations, such as electricity, gas, water, phone, television, and other utilities and services. Each of the budget entries may be associated with one or more connected devices 130, such as a thermostat, shower, refrigerator, phone, etc. The device hub 102, upon establishment of the master budget 120, can connect to data sources associated with each of those connected devices 130 (e.g., the devices themselves or a data source where device information is published), as well as channels to send information and operational instructions back to the connected devices. The set of connected device information 122 can store and define connection information to each of the connected devices 130, information on the devices 130 themselves, and/or specific information related to the operation of and/or unique features or each device 130. For example, if two or more thermostats are available in a house, one of the thermostats may be defined as a master thermostat, or may be identified as including a GUI capable of delivering messages to users. If a rule requires a user to be contacted via the device, the message may only be sent to the master thermostat having the GUI or display. Similarly, the connected device information 122 may define particular device APIs or addresses at which instructions and messages can be sent back to the devices 130. Memory 118 also includes a set of device management rules 124. The device hub 102 (and specifically, the hub application 110) can use received usage and spending information from various ones of the plurality of connected devices to compare those values to the budget 120 and, subsequently, identify one or more rules (from a set of device management rules 124) to perform and enforce.

The various device management rules 124 can represent a set of logic-based rules for maintaining the master budget 120. The device management rules 124 may be a default set of rules or a customized rule set. The rules may prioritize device usage and/or operations, providing various alternatives, modifications, and permutations of operations to be performed in response to particular actions from one or more of the connected devices 130. In some instances, the priorities may be defined by a user associated with the device hub 102 and/or the environment 100. For example, a user may prioritize the temperature of a home to have a higher priority than the brightness of an adjustable light. In instances where a particular connected device 130 has been used more than budgeted, the device management rules 124 may cause the adjustable light to be dimmed before changing the temperature of the thermostat. The priorities of the device management rules 124 may include a hierarchy or priority of rules and/or devices as defined by the customer. For example, a particular customer may value warmth via a heating system over water temperature. By setting the heater to a higher priority, the device management rules 124, when executed and used, may determine that a water heater's temperature be reduced prior to a reduction in temperature via the thermostat. In a hierarchical rule set, different sets of devices may be prioritized at different levels, where a device at a relatively lower level will be more likely to be associated with operational modifications than a device at a relatively higher level in the hierarchy. By preparing the prioritized or hierarchical device listing, the customer can define what devices and operations are most important to them, such that the master budget 120 and device hub 102 the priority information into consideration when performing their budget management operations.

In some implementations, each device associated with the master budget can be individually monitored and incorporated into the master budget 120. Additionally, the master budget 120 may include one or more sub-budgets or budget categories in which particular related devices can be combined for budgeting purposes. This grouping can allow customers to manage budgets for related costs, utilities, and general categories. For example, items that use or influence a particular utility bill or resource in common may be grouped, such as a gas oven, gas water heater, and gas heating system. These devices may all be combined into a particular budget category, such that if a decision is made to reduce spending associated with a gas utility bill, decisions as to which of the gas-related devices to modify can be made. Because some devices use two or more types of utility or represent shared costs with different types of devices, a single device may be associated with multiple budget categories. For example, the gas water heater may be associated with both a water budget category and a gas budget category. In some instances, to maintain a particular budget category, operational adjustments can be made to devices associated within the budget category. For example, if both bathroom lighting and shower temperature are in the same category, a relatively long shower may cause certain lights to be dimmed after a budgeted amount of hot water usage is met. Such adjustments can be performed inter- and intra-budget categories, thereby managing the budget to a customer's particular usage.

The budget and usage of certain network-connected devices may be associated with set limits to prevent reducing or increasing spending above those limits. For example, if a determination is made based on the master budget 120 and current spending to reduce a thermostat, the set limits may prevent the thermostat from reducing or increasing the set temperature past certain set limit. These set limits may be default values, values identified based on a location of the managed residence or business (e.g., current or expected weather at the location), or customer-defined values, among others. In instances where an operational rule or adjustment is determined to be made to a device that would cause that device to exceed its set limit, alternative operational modifications to that device or another device may be substituted after further consideration by the master budget 120 and the device hub 102.

Based on minimum settings and set limits for particular devices, the master budget 120 may be limited to a lower bound at which no further reductions can be made. In such instances, a global minimum budget based on the lower bounds of each device can be used to identify the minimum master budget 120 possible. Attempts to reduce particular portions of the budget below any of these minimum amounts may cause a notification to be sent to the customer (e.g., from and/or via the device hub 102) that would indicate such requested reductions were not available. If the proposed modification was to a specific network-connected device 130, an alternative operational modification for a different device may be suggested. In some instances, the alternative operational modification may be to another device within the same budget category as the specific device.

As noted, the device hub 102 includes the hub application 110. The hub application 110 represents an application, set of applications, software, software modules, or combination of software and hardware used to manage the master budget 120 and operations of the plurality of connected devices 130. In the present solution, the hub application 110, via the operations of the device hub 102, can determine usage or spending information associated with one or more of the plurality of connected devices 130 and adjust operations of at least one of the connected devices 130 in response. In some instances, the hub application 110 may request or cause adjustment of a connected device 130 based on that connected device's own usage information. In other instances, in response to receiving information on a first connected device 130, the hub application 110 may cause operational changes to one or more connected devices 130 other than the first connected device 130. In some instances, each master budget 120 may be associated with a period of time or events. At the end of each period, a determination can be made as to whether the total spending associated with the master budget 120 has been exceeded or whether additional funds are available. If additional funds are available, the hub application 110 can cause the excess and unspent funds to be transferred from a user account 178 at the financial system 160 to one or more savings accounts and/or investment funds. As illustrated, the hub application 110 includes a budget analysis module 112, a device management module 114, and a banking access module 116. Additional modules and functionality may be included in alternative implementations. In some implementations, instead of saving or investing funds into an account, at least a portion of the excess and unspent funds may be redistributed into the master budget 120 itself, allowing for additional spending in particular areas of the budget. For example, after a budget period where excess funds remain, customers may choose, for future budgetary periods, to place their thermostat at a more comfortable temperature without the need to modify the operations of another connected device. Alternatively, any set limits to particular devices may be changed to a less strict amount, rules may be modified to allow a wider (or narrower) range of operational modifications for particular devices. The additional spending can be used for future periods of the same budget item or the excess amounts can be used for other budget items. For example, if gas usage was low in a first budgetary period, the excess could be allocated to: 1) savings/investing; 2) a rollover to the next period for increased allowed budget of gas usage; or 3) distributed to cover a water budget overage (either in the current first budgetary period or in future budgetary periods).

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The illustrated modules of the hub application 110 may be combined into a single application or module in some instances. The budget analysis module 112 can request, receive, locate, and otherwise interpret usage and spending information received from or associated with the plurality of connected devices 130. Additionally, the budget analysis module 112 can compare the received or identified information with the master budget 120 to determine relative amounts of usage or spending as compared to previously budgeted amounts. Using that information, the budget analysis module 112 can pass the results to a device management module 114.

The device management module 114 can determine, based on the device management rules 124, one or more actions to be taken with regard to the plurality of connected devices 130. In some instances, instructions to perform a particular action at a particular connected device 130 or set of devices 130 may be identified and transmitted to the appropriate device(s) 130. The hub application 110 can use the interface 104 to communicate with the devices 130.

The banking access module 116 provides a set of financial functionality associated with the hub application 110. The banking access module 116 can correspond with the financial system 160 and link the device hub 102 to a particular user profile 176, in turn associated with one or more user accounts 178. The banking access module 116 may also be used to interact with, define, and modify one or more instructions 180 related to user funds and accounts. When the amount spent over a period is less than a budgeted amount, the banking access module 116 can identify the excess funds and interact with the financial system 160 to move at least a portion of the excess funds to accounts identified by the user using the user fund instructions 180.

Device hub 102 can also include a graphical user interface (GUI) 108. The GUI 108 interfaces with at least a portion of the environment 100 for any suitable purpose, including generating a visual representation of a web browser and/or the hub application 110. In particular, the GUI 108 may be used to view and navigate various web pages or application functionality located both internally and externally to environment 100, as well as to view and navigate through information accessed by the hub application 110, such as information stored at or associated with the financial system 160 and/or one or more of the connected devices 130. Generally, the GUI 108 provides the particular user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with the master budget 120, operations of the one or more connected devices 130, or fund instructions 180 associated with user accounts 178 at the financial system 160. The GUI 108 may present information associated with the hub application 110 for viewing and interaction. In general, the GUI 108 is often configurable, supports a combination of tables and graphs (bar, line, pie, status dials, etc.), and is able to allow users to modify instructions, parameters, and settings associated with the hub application 110. Therefore, the GUI 108 contemplates any suitable graphical user interface, such as a combination of a generic web browser, intelligent engine, and command line interface (CLI) that processes information in the platform and efficiently presents the results to the user visually.

The illustrated device hub 102 is intended to encompass any computing device such as a desktop computer, laptop/notebook computer, mobile device, smartphone, personal data assistant (PDA), tablet computing device, one or more processors within these devices, or any other suitable processing device. For example, the device hub 102 may comprise a computer that includes an input device, such as a keypad, touch screen, or other device that can accept user information, and an output device that conveys information associated with the operation of the hub application 110 or the device hub 102 itself, including digital data, visual information, or a GUI 108, as shown with respect to the device hub 102.

As illustrated, the device hub 102 illustrates a single device or component including the full hub application 110 and its related functionality. In other implementations, some or all of the illustrated device hub 102 may be located in or associated with one or more other components, as well as components and/or locations not shown in FIG. 1. For example, the device hub 102 may be a cloud-based component or application. The device hub 102 can manage the master budget 120 and the associated rules 124, issuing instructions to the connected devices 130 directly or to a particular device within or associated with the plurality of network-connected devices 130. Restated, some or all of the operations currently illustrated with the device hub 102 may be moved or located at a remote location, including a cloud-based solution. Logic for managing the master budget 120 and determining one or more operational modifications may be managed at the remote or cloud-based location(s). One or more of the connected devices 130 and/or a portion of the illustrated device hub 102 may retain functionality for receiving the instructions from the remote and/or cloud-based solution and relaying those instructions to particular connected devices 130 with which the instructions are associated. In that example, a local device (either a stand-alone device or one of the connected devices 130) may retain the described device management module 114, while the remote or cloud-based solution may manage the other portions of the hub application 110. The connected devices 130 may also use the local device to access and interact with the master budget controller and other logic located at the remote and/or cloud-based solution. In some implementations, the hub application 110 or at least a portion thereof may be managed by and/or executed at the financial system 160. In the cloud-based solution, a corresponding web application and/or mobile app may be used to set and modify operational settings related to the master budget 120. Any suitable combination for managing the master budget 120 to maintain the budget and modify operations of one or more connected devices 130 is contemplated in this disclosure.

The plurality of connected devices 130 may include many different device types, each of which are capable of interacting—either directly or indirectly—with the device hub 102. The connected device 130 illustrated in FIG. 1 is an example of one of any number of variations of connected devices 130, and is meant to be an example device. Alternative, additional, or different components may be associated with and/or included within different implementations.

As illustrated, connected device 130 includes an interface 132, a processor 134, and operation module 136, a device API 138, device inputs 140, and memory 142. The interface 132 and processor 134 may be similar to those of the device hub 102, or they may be different. In general, interface 132 allows each connected device 130 to interact with the device hub 102. In some instances, interface 132 may allow the connected device 130 to directly connect to the device hub 102 either through network 150 or, alternatively, via direct communications with the device hub 102. Processor 134 allows the connected device 130 to execute its base functionality as well as to perform any suitable "intelligent" operations, such as sharing usage and spending information with the device hub 102 and/or receiving instructions to automatically and/or manually modify operations of the connected device 130. The operation module 136 is any application defining and performing the operations associated with the connected device 130. The operation module 136 uses normal operating instructions 144 to perform the standard operations of the device 130 and can provide or make available a set of usage and/or spending information 148. The usage information 148 can track or monitor information based on the usage of the connected device 130, with such information either being made available to the device hub 102 (e.g., via device API 138) or being transmitted to the device hub 102. The device hub 102 can then use that information to compare against the master budget 120 and identify operational adjustments to be made, if any, to one or more connected devices 130.

Some connected devices 130 may have their own GUI or display (not shown in FIG. 1). In instances where the instructions are received from the hub application 110 at the connected device 130, the display can provide information as to either suggested manual operational adjustments or information on automatic operational adjustments that may have been made. Users can modify the behavior of the connected device 130 by using existing device inputs 140, such as buttons or other controls available to users. Where a manual operational adjustment is received at the connected device 130 with information on the adjustment presented via the display, the user can actuate the modification using the device inputs 140 as appropriate. In some instances, operational adjustments may be automatic, but may require approval from the user prior to implementing said changes. The approval to make the changes may be presented at the connected device 130 itself, the device hub 102, or at a separate application on any suitable device (e.g., via a smartphone, email application, or web-based hub application, among others).

Memory 142 may be similar to or different than memory 118. As described, memory 142 includes the normal operation instructions 144 and the usage and/or spending information 148. Additionally, memory 142 may include budget-based modification instructions 146. The budget-based modification instructions 146 may be used where specific instructions are not provided by the device hub 102, but instead where information related to budget-based performance is provided. The budget-based modification instructions 146 allow the connected device 130 to intelligently modify its operations based on the budget performance before or in lieu of instructions received from the device hub 102.

As previously noted, each connected device 130 may be different or include different options. In general, the connected devices 130 represent normal appliances, components, or things within a connected environment 100 that can also provide enhanced, intelligent decision-making and/or that can be instructed to modify their behavior in response to an outside influence, such as the hub application 110.

The illustrated financial system 160 represent a system performing financial operations in response to budget analyses performed at the device hub 102. In some instances, the master budget 120 may be maintained at the financial system 160, with information from the various devices 130 being used there to determine operational modifications to be performed. As illustrated in FIG. 1, however, the financial system 160 receives information on budget performance from the device hub 102 to perform particular actions with funds remaining in the budget after periodic analyses. In some instances, the financial institution 160 may provide the hub application 110, or alternatively, operations of the device hub 102 may be performed by the financial system 160.

The financial system 160 includes interface 162, processor 164, financial management application 166, and memory 174. Interface 162 and processor 164 may be similar to or different from interfaces 104, 132 and processors 106, 134. Processor 164 executes the financial management application 166, which performs financial operations in response to the budget performance. The financial management application 166 can associate particular device hubs 102 with specific user profiles 176. Each user profile 176 may be associated with one or more user accounts 178 and a set of user fund instructions 180. Based on the budgetary performance reported by the device hub 102, the financial management application 166 can determine the actions to be taken based on the user fund instructions. In some instances, the user fund instructions 180 may define rules for how excess budget is to be spent or invested. In some cases, the instructions 180 may direct the financial management application 166 to deposit funds from a primary account associated with the master budget 120 (e.g., one of the user accounts 178) to transfer funds to one or more other user accounts 178. The other user accounts 178 may include a savings account, an investment account, a retirement account, or other suitable accounts. In some instances, excess budget may be applied to credit or debt accounts, such as credit card accounts, student loan accounts, home mortgage accounts, or any other suitable account. A savings and investment module 168 can manage the transfer of funds in many instances, such as when the financial system 160 is associated with a financial institution with which the user holds an account. The financial institution can then implement the defined instructions 180 in response to identifying the excess funds. In some instances, the financial management application 166 may include a third-party system interface 170 for accessing and implementation financial operations associated with the budget performance. Third-party systems may include accounts other than those of the underlying financial institution associated with the financial system 160.

Memory 174 may be similar or different than either of memory 118 and memory 142. As described, memory 174 includes the user profile 176 as well as third-party system links 182. The third-party system links 182 can provide access information for one or more third-party accounts defined in the user fund instructions 180, and can be used by the third-party system interface 170 to perform the investments or savings as defined by the user.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
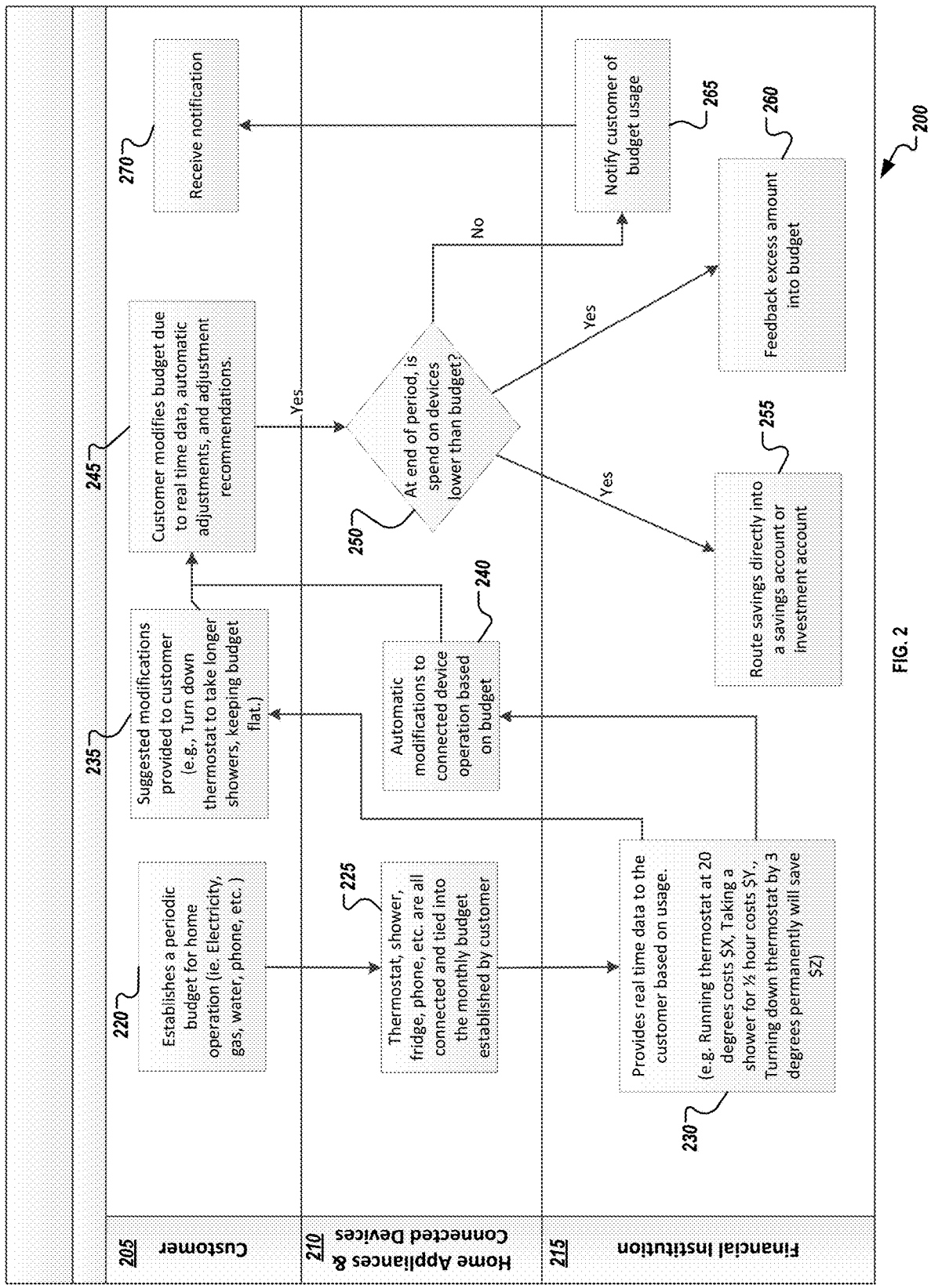
FIG. 2 is a swim-lane diagram illustrating example operations related to implementing and managing a resource allocation and automatically allocating remaining funds to a savings or investment account.

FIG. 2 is a swim-lane diagram illustrating example operations related to implementing and managing a resource allocation and automatically allocating remaining funds to a savings or investment account. Herein, the resource allocation is referred to as a budget. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

FIG. 2 describes an example set of operations across three actors, a customer 205, a plurality of home appliances and connected devices 210, and a financial institution 215. Although described in a particular layer, some of the operations may occur at a different layer in particular implementations. Alternatively, some of the operations may occur at multiple layers in other implementations, such that an illustrated operation occurs in multiple steps or actions at two or more layers. Further, in the illustrated example of FIG. 2, the financial institution 215 may directly provide instructions to the home appliances and connected devices 210 and/or the customer 205. The financial institution 215 may manage the analysis and instruction determinations at a device hub (e.g., device hub 102 from FIG. 1), or the analysis and instructions determinations may be made remotely at the financial institution 215.

At 220, a customer 205 can establish a periodic (e.g., a daily, weekly, monthly, or any suitable period) resource allocation, or budget, for home operations, including, for example, electricity, gas, water, and phone operations. Each of those home operations may be connected to one or more devices or appliances 210, each of those home appliances and devices 210 able to provide information on their usage and/or spending and to receive suggested and/or automated operational modifications from a device hub or the financial institution 215.

Once the budget is set, the various home applications and devices 210 are connected to the monthly budget established by the customer 205 at 225. The devices 210 may be individually programmed with specific instructions on how and where to communicate. For example, the devices 210 may be programmed to communicate with a particular device hub (e.g., device hub 102), the financial institution 215, or a website or other location. The communication instructions may allow for two-way (or multi-way) communications so that the financial institution 215 and/or a device hub may provide instructions to the devices 210, where appropriate. In some instances, one or more of the devices 210 may be connected to one or more different ones of the devices 210 such that operations of the one or more and different ones of the devices 210 are symbiotic or otherwise interrelated.

At 230, the financial institution 215 can provide real-time data to the customer 205 based on the usage and/or spending associated with the usage of the various devices 210. The real-time data can include general suggestions without specific reference to the budget, or specific recommendations for modifying operations of one or more of the devices. The real-time data can include information about current operations of the devices 210 as well as suggestions to the customer 205 as to how funds could be saved, such as "running the thermostat at 70 degrees costs $X," "taking a ½ hour shower costs $Y," and "reducing the thermostat by 3 degrees permanently will save $Z.") The financial institution 215 (or the hub device 102 of FIG. 1) can compare current usage to a budgeted amount to determine whether measures should be taken to manage and maintain the budget. In some instances and as described above, the financial institution 215 (or the hub device 102) may generate one or more suggested modifications and provide them to the customer 205 at 235. These suggestions can be presented at the devices 210 themselves or may be sent to a mobile device, inbox, or other suitable location for the customer 205 to review and, if agreed, implement. Alternatively, the financial institution 215 (or the hub device 102) can provide instructions to the devices 210 directly to perform automatic operational modifications to bring the master budget into a maintained order, where those devices 210 can perform the automated operational modifications at 240.

Upon the modifications, the customer can reduce their budget based on the real-time data, the automatic adjustments, and the suggested adjustment recommendations at 245. In some instances, the budgeted amounts may stay the same, while the amount actually spend is lowered.

At the end of each budgetary period, a determination as to whether a total spend on the devices 210 is lower than the spending budgeted in the master budget is made at 250. As noted, budgetary periods may be any suitable period of time, including hourly, daily, monthly, or other time periods. In some instances, usage information for particular devices 210 can be used to calculate a spent amount if bills or spending amounts are not readily available. If the total actual spend is less than the budgeted spending, the financial institution 215 can route, at 255, at least a portion of the budget savings from a designated account associated with the master budget directly to a savings or investment account of the customer 205. In some instances, the customer 205 may have provided instructions on how particular funds are to be deposited or invested, including moving the funds into two or more accounts, including accounts outside of the financial institution 215. In other alternatives, some or all of the excess funds after a budgetary period may be fed back into the budget to provide a budgetary cushion for the next period, or some or all of the excess funds may be used to loosen the budget by reducing set limits on one or more of the connected devices. In doing so, the excess funds may be used to make the next budgetary period more comfortable for the customer by reducing the operational adjustments suggested and/or made by the system moving forward. In some alternatives, a specific savings amount goal may be identified prior to a budgetary period. In those instances, the system can track and modify activities in order to meet the savings amount goal.

When a determination is made that the actual spending is higher than the budgeted amount, the financial institution 215 or device hub 102 notifies the customer 205 of the over-budget usage at 265. The notification may include, among other items, recommendations for operational modifications, a request to modify the budget for the next period, for authorization to allow additional automatic modifications throughout the budgetary period. At 270, the customer 205 can receive the notification (from 265) and accept or act upon some, none, or all of the information within the received notification.

Figure 3:
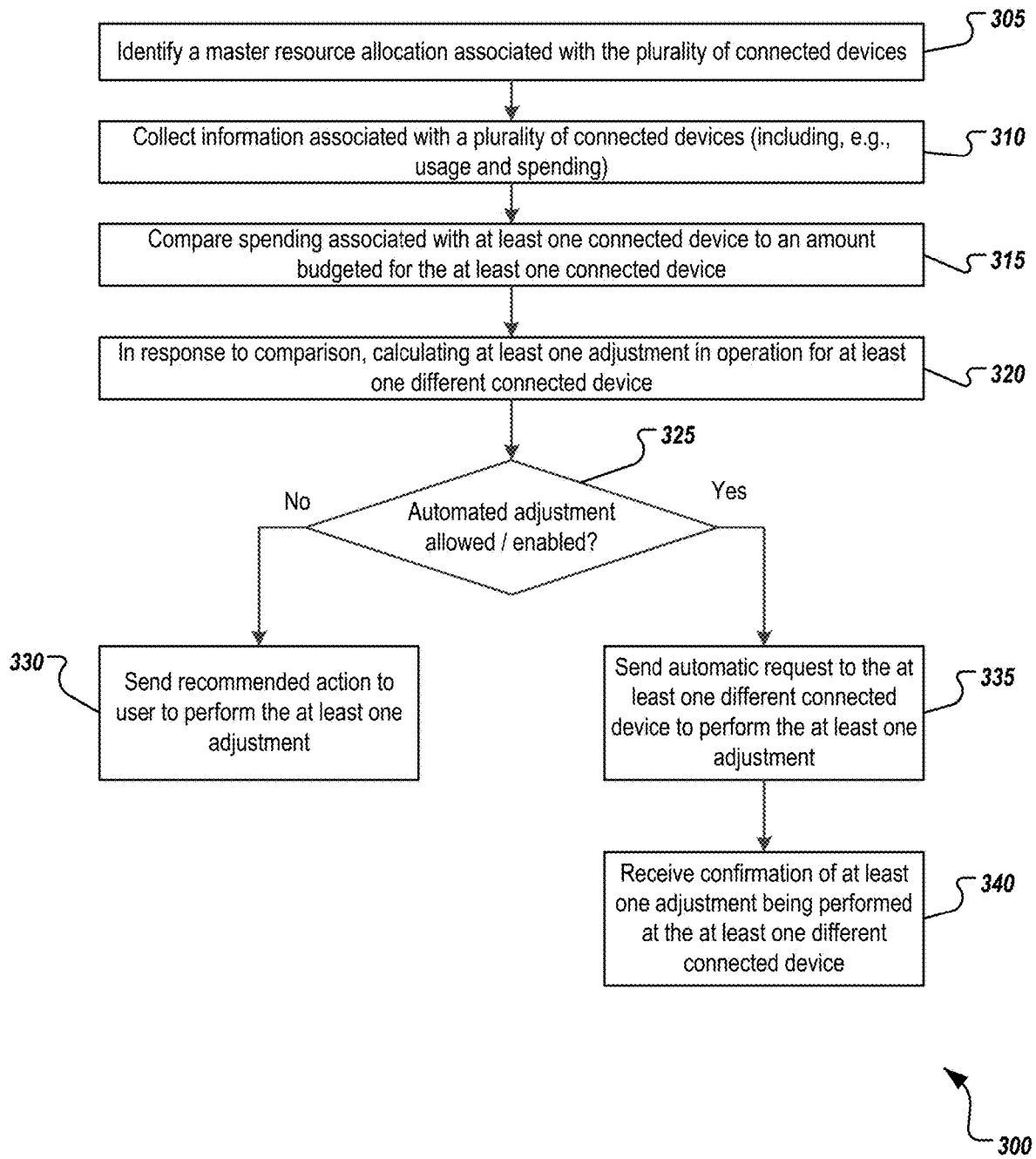
FIG. 3 is a flowchart of an example operation for using a master resource allocation to compare actions performed by one or more network-connected devices and adjusting operations of at least one other network-connected devices based thereon.

FIG. 3 is a flowchart of an example operation for using a master resource allocation to compare actions performed by one or more network-connected devices and adjusting operations of at least one other network-connected devices based thereon. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a master resource allocation associated with a plurality of connected devices is identified. The master resource allocation may be managed at a device hub or mobile device executing an application specifically developed to interact with the plurality of connected devices. Alternatively, the master resource allocation may be maintained at a financial institution of a customer associated with the master resource allocation. The master resource allocation can identify various budgeted bills, activities, or actions associated with the operation of various connected devices. Further, the connected devices are able to share or make available information on the devices' usage and associated costs. In some instances, the devices may determine the costs associated with their operation, while in others, the devices may only provide their usage amounts. For example, a smart thermostat may be able to determine the current outside temperature, the number of hours the air conditioner and/or heater were running, and the temperature to which the thermostat was set. That information may be provided to a system interacting with the master resource allocation to determine the costs associated with those operations. In other instances, particular devices may be able to calculate actual or estimated energy costs based on an amount of power used multiplied by a given rate.

At 310, usage, costs, and spending information associated with at least some of the plurality of connected devices is collected. In some instances, the connected devices may provide such information directly to a device or application managing the master resource allocation. In others, the connected devices may provide that information to a third-party or defined repository, at which the device or application can access the information and use in its calculations.

At 315, the actual spending and costs associated with at least one connected device is compared to an amount budgeted for the at least one connected device. In some instances, the comparison may occur at regular intervals, such as each hour, each day, each week, etc. Alternatively, the comparison may instead occur in response to events, such as when a certain amount of spending associated with the at least one connected device is reached. The amount may be 25%, 50%, or 75% of the budgeted amount, which may happen at an unexpected time or at a different time during a budgetary period than expected. For example, if spending for a particular connected device reaches 50% of the budgeted amount a week into a monthly budgetary period, one or more adjustments may need to be made.

At 320, at least one operational adjustment for one or more connected devices is calculated in response to the comparison. The at least one operational adjustment may be to operations of the at least one connected device for which spending exceeded the budgeted amount, or alternatively to another connected device among the plurality of connected devices. A defined rule set may be used to determine the appropriate actions to take or recommend in response to the over resource allocation usage of particular connected devices. By prioritizing devices, the rule sets may be able to modify the operations of a device of relatively lower importance or preference while maintaining preferred operational statuses of higher priority devices. Similarly, the rule set may define particular parameters for allowed changes, such as maximum adjustments to thermostat temperatures, water temperatures, relative lighting, and other suitable changes. Further, the rule set may define minimum budgets associated with individual devices, groups of devices, and/or the collective plurality of devices. Based on requirements of the living and/or working conditions of the household or business associated with the master resource allocation, minimum allocations for individual devices, related groups of devices, and/or all of the plurality of connected devices may be defined, where the minimum resource allocation equals the minimum cost of the amount needed to run the devices at their minimum required levels. These rule sets may be defined and updated by users, or they may be default settings associated with the devices or scenario. The rule sets may also determine whether calculated operational adjustments are allowed to be performed automatically or if suggestions must be passed to the customer before their implementation.

The rule set can determine what is allowed automatically and what requires customer approval and/or customer action.

At 325, a determination is made as to whether an automated adjustment is allowed and/or enabled. In some instances, particular connected devices may not be able to automatically modify operations, instead requiring the customer to manually perform the action. Additionally, customers may limit via the rule set which adjustment can be performed automatically and which are not.

In response to a determination that automated adjustments are not allowed or enabled, method 300 continues at 330 where the recommended action is sent to the customer suggesting that the at least one adjustment is performed. The suggestion may be sent to a display on the particular connected device associated with the adjustment, to another device used by the customer, such as a smartphone or tablet via a notification, or via email or other messaging technology. The customer can then choose whether to accept or reject the change, either by activating a corresponding button or menu item through the presentation (and thereby authorizing the operational adjustment), or by manually using inputs on the corresponding connected device to make the change. In some instances, the customer may choose to perform a partial adjustment, such as changing the thermostat by 2 degrees instead of the suggested 3 degrees. Alternatively, if the user chooses not to perform the suggested change, method 300 may return to 320 to determine an alternative operational modification that could be made.

In response to a determination that an automated adjustment is allowed and enabled at the connected device(s) associated with the calculated operational modification, method 300 continues at 335. At 335, a request to perform the automatic adjustment is sent to the connected device, which may be different than the connected device associated with the resource allocation overage. At 340, a confirmation that the at least one automatic adjustment is performed at the connected device is received. This confirmation can be reported back to the customer. In some instances, the customer may be given an opportunity to reverse the automatic modification.

Figure 4:
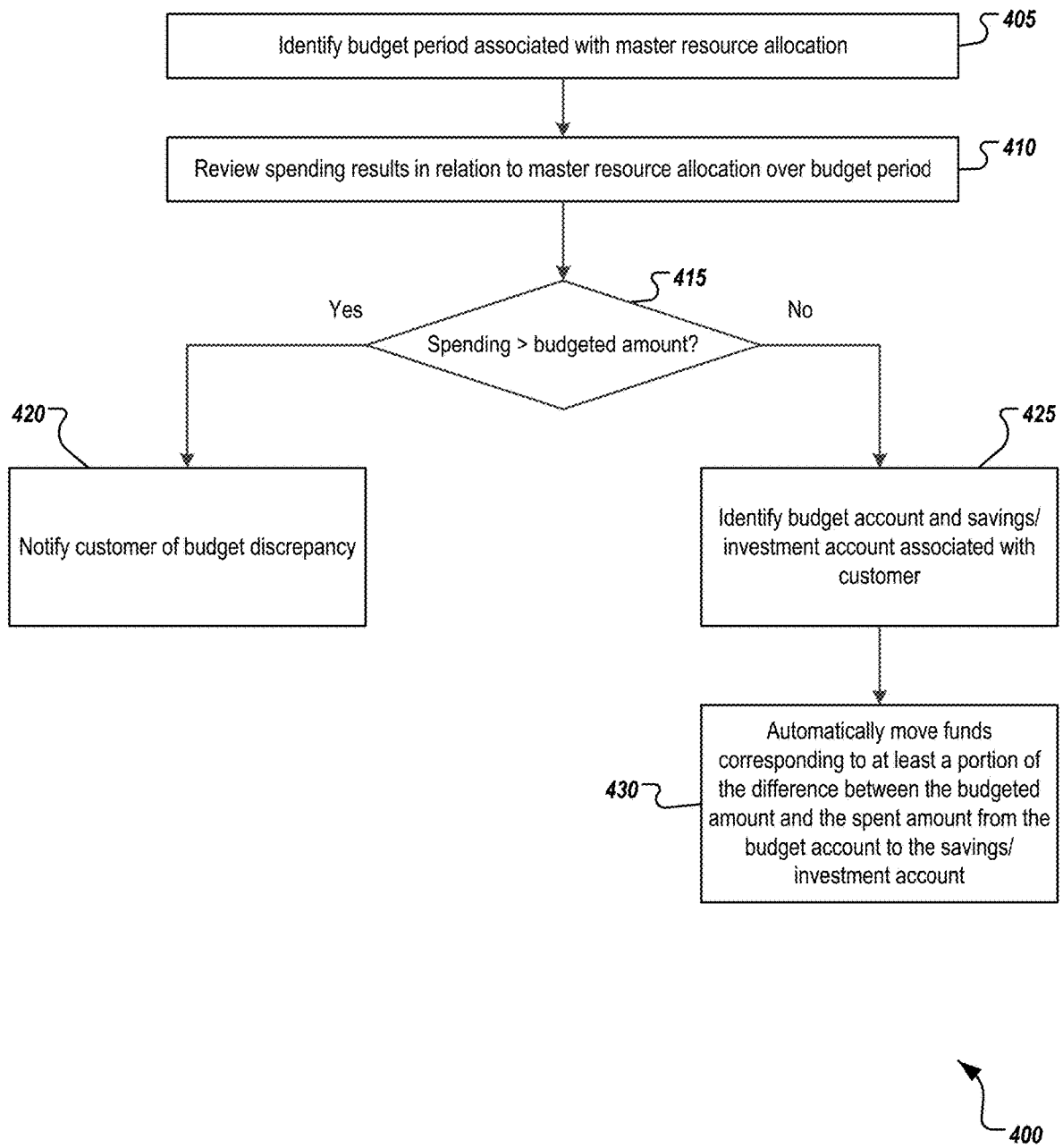
FIG. 4 is a flowchart of an example operation for automatically saving or investing excess funds remaining from a master resource allocation at the end of a period of time, where the funds to be saved or invested represent at least a portion of a difference between an actual spending amount and an expected spending amount associated with the resource allocation.

FIG. 4 is a flowchart of an example operation for automatically saving or investing excess funds remaining from a master resource allocation at the end of a budget period, where the funds to be saved or invested represent at least a portion of a difference between an actual spending amount and a budgeted spending amount. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a budget period associated with the master resource allocation is identified. The budget period may be a regular interval, such as week, month, or quarter. Alternatively, the budget period may be associated with particular events or occurrences. At 410, spending results for the plurality of connected devices are reviewed in relation to the master resource allocation at the end of each budget period.

At 415, a determination is made as to whether the spending over the budget period is greater than the amount budgeted for the master resource allocation. If so, method 400 continues at 420, where a notification of the overage is provided to the customer indicating the budget discrepancy. In some cases, the notification can include one or more recommendations to reduce spending permanently, including actions and changes to settings associated with one or more of the connected devices.

If a determination is instead made that the spent amount is less than the allocated or budgeted amount, method 400 continues at 425. At 425, budget accounts (e.g., a checking account) and savings and/or investment accounts associated with the customer are identified. Additionally, one or more savings/investment rules are identified to determine how any excess funds are to be used. At 430, funds corresponding to at least a portion of the difference between the spent amount and budgeted amount can be moved to the identified savings and/or investment accounts according to the defined rules. Any suitable combination of savings and investments can be used, as well as fund transfers to non-savings and non-investment accounts, such as student loans, mortgage accounts, credit card accounts, or other suitable accounts. As described above, one alternative to moving funds to particular accounts may be to use some or all of the excess funds to provide a budgetary cushion for the next period, or to adjust settings within the master budget to a more comfortable level. For example, parameters for suggesting or making an operational adjustment to a thermostat may be lessened and/or made less reactive, allowing the temperature to stay at a lower temperature in the summer or a higher temperature in the winter as compared to previous months where the thermostat may be changed sooner in reaction to other device-related spending.

For the foreseeable near future, the majority of homes will not be fully connected with smart, or connected, devices. Further, within a single utility bill (e.g., water, electricity, etc.), connected devices may represent some of the usage, while other non-connected devices may represent additional usage and costs, while not being part of the master resource allocation of connected devices. In one implementation, operations to determine usage and costs associated with non-connected devices can be estimated and incorporated into the master resource allocation. Further, after incorporation, determined overages or excessive use of the one or more non-connected devices may be identified based on a review of the usage of the connected devices in light of the overall usage, and evaluating whether overages can be associated with particular non-connected devices where the connected devices are not responsible for the determined overage.

In one instance, non-connected devices can be added to the master resource allocation and used to project and estimate an overall budget. FIG. 5 is a flowchart of an example operation 500 for adding a non-connected device into a master resource allocation. Particular non-connected devices to be added to the master resource allocation may be manually added or identified by users in some instances. In other instances, publically available information associated with a property may be used to identify a particular non-connected device, such as when users purchase or rent a property and device information included at the property is available. Other methods of identifying non-connected devices may be used.

At 505, a non-connected device to be associated with a master resource allocation is identified. In associating the non-connected device to the master resource allocation, the non-connected device may be particularly associated with one or more bills. For example, a new non-connected washing machine may be associated with both electricity and water bills, such that usage impacts multiple bills in different amounts.

At 510, a determination is made as to whether the non-connected device has previously been in use. In some instances, the use may be associated with the current user, or the use may be associated with a previous user, tenant, or person. The determination is made because in some instances, prior bills during which the non-connected device was in use may be used to determine, at least in part, an estimated usage amount and spend associated with the non-connected device. In some instances, prior bills addressed to persons other than the user may be available and used in the analysis. Where the non-connected device was not previously in use, alternative means of identifying an estimated usage may be used. When the non-connected device was previously in use, method 500 continues to 515.

At 515, at least one bill associated with the non-connected device is identified, where the non-connected device was in use during the period associated with the at least one bill. In some instances, the budget estimates can be performed for each bill type associated with the non-connected device where two or more utilities are impacted by the device's usage. Additionally, multiple billing periods can be considered where the non-connected device was in use, such that an average or adjusted amounts of usage and spend can be calculated. At 520, known usage of connected devices associated with the at least one identified bill, as well as estimated usage of any other non-connected devices, can be removed from the at least one bill to identify usage associated with the non-connected device. At 525, the estimated usage associated with the non-connected device can be determined based on the remaining usage associated with the at least one identified bill. In multiple bill scenarios, a usage pattern may be identified upon analysis when usage varies across days, weeks, months, or seasons. In some instances, usage may be similar across different bills, such that an estimate may be obtained by averaging the usages across the different bills. Further, in some instances, additional causes of usage and costs may remain after removal of the connected and other non-connected devices at 520. Determining the estimated usage of the non-connected device at 525 may include a verification operation, where the estimated amount is compared to a device profile of the non-connected device or to similar usage of the non-connected device (or similar devices) by one or more cohorts of the user, where if the estimated usage is significantly different than the estimated usage associated with the profile or cohorts, the determined estimated usage can be modified accordingly. Method 500 can then continue to 545, where the estimated usage and allocation is incorporated into the master resource allocation.

Returning to 510, if it is determined that the non-connected device was not previously in use, method 500 continues to 530. As noted, various options for determining an estimated usage associated with the non-connected device may be used. At 530, historical information associated with a particular cohort of users similarly situated to the user may be identified, along with historical information of usage of the same or similar devices as the particular non-connected device. In some instances, the cohort information may be associated with a personal profile of the user, where members of the cohort include persons in the same location of the user, with the same family makeup or size of the user, or the same income level of the user, among others. Further, only cohort members using the same or a similar device as the non-connected device may be considered, in some instances. Based on this connection to the cohort, historical and expected usages associated with those cohort members may be used, at least in part, to determine an expected usage of the non-connected device. At 535, manufacturer information may be identified that is used to identify an expected usage and cost related to the same and/or similar devices as the non-connected device. For example, a new washing machine may use a certain amount of energy and water per cycle per the manufacturer. Based on an estimated number of cycles performed, the energy estimate can be used to identify daily, weekly, monthly, etc. usage estimates for the washing machine. Similar information may be found for other types of devices. In some instances, manufacturer and cohort information may be combined to fine-tune estimates. At 540, an estimated usage amount associated with the non-connected device can be determined based on the identified information of 530 and 535, as well as other suitable information that can be used to estimate usage and costs associated with a new non-connected device. At 545, the estimated usage and budget is incorporated into the master resource allocation. By incorporating the estimated usage and budget associated for the non-connected devices into the master resource allocation, a total operational budget can be determined and maintained, as opposed to a resource allocation of only the connected devices.

FIG. 6 is a flowchart of an example operation 600 for using a master resource allocation to determine an overage associated with at least one non-connected device. In some instances, method 600 may be executed after method 500 has been performed, although method 500 is not required for method 600 or similar methods to be used. In general, method 600 of FIG. 6 illustrates how budget overages associated with the non-connected devices can be identified and managed.

At 605, an overage associated with a master resource allocation is identified, where the overage is associated with a particular bill included in the master resource allocation, such as an electric or water bill. In some instances, multiple overages may have occurred during a particular billing period. In those instances, multiple instances of method 600 may be performed for the different bills.

At 610, a determination is made as to whether one or more of the connected devices associated with and contributing to the particular bill are responsible for all of the overages. As the usage of the connected devices can be monitored and excessive or unexpected usage can be identified, the determination can be based on a comparison of actual and budgeted usage of the connected devices associated with the particular bill. If one or more of the connected devices are wholly responsible for the overage, method 600 can continue to 615, where the overages from the connected devices are addressed using the previously described methods, such as method 300. In some instances, a portion of the overage may be associated with one or more connected devices, while the rest of the overage is determined not to be associated with the connected devices. In such instances, overages associated with the connected devices can be addressed at 615, while overages associated with the non-connected devices can be addressed as described in 620 through 640.

When at least a portion of the overages is determined to not be associated with the connected devices, method 600 continues at 620. At 620, the overages not associated with the connected devices are determined. In some instances, the determination may be made by removing the overages caused by the one or more connected devices to leave a remaining overage amount. In some instances, any additional overage may be assumed to be associated with at least one non-connected device. At 625, at least one non-connected device associated with the particular bill can be identified. In some instances, multiple non-connected devices may be associated with a particular bill. In others, only one non-connected device may be associated with the particular bill. In some instances, expected usage amounts associated with particular non-connected devices may be available or included in the master resource allocation. In some instances, usage profiles identifying one or more distinctive types of usage may be available. For example, a washing machine may use water for rinsing dishes over a certain period of time, while a heating element and related operations use a certain characteristic of electricity and/or gas over another period of time. Other distinctive utility usages may be known or retained for different device types (e.g., as determined by manufacturers, similar connected devices, etc.). In some examples, overages not associated with the connected devices may be analyzed based on information captured by smart meters or devices managing all electrical or water usage at home, such that the usages not associated with the connected devices can be isolated and analyzed, particularly where the usage results in or is associated with overages. At 630, the usage data associated with the overage and the non-connected devices (i.e., and not the connected devices) is analyzed to determine one or more non-connected devices associated with the determined overage. As noted, the analysis may identify particular non-connected devices causing at least a portion of the overages.

At 635, one or more recommended actions associated with the one or more determined non-connected devices can be identified. The recommended actions may include reducing usage of a particular non-connected device, changing a time of usage, replacing the non-connected device with a connected device and/or a more efficient connected- or non-connected device, as well as other recommendations. At 640, the identified recommendations can be provided to the user for potential action.

In some instances, particularly where ongoing total usage of a particular utility can be monitored (e.g., using a smart electric meter), real-time information on usage versus a master resource allocation can be monitored. Similar to the illustrated operations of method 600, determinations can be made in real-time to determine when and how usage during a budgetary period compares to a budgeted amount associated with the utility. In those instances, information from the connected devices can be used to determine if the connected devices are being used within their budgeted usage and cost levels. When the budgeted amount of the connected devices are being maintained, but overages as to the overall usage of the utility are identified, similar processes can be used to determine one or more of the non-connected devices associated with the excess usage or other overages. In doing so, when the user is approaching the full master resource allocation during a budgetary period, the system can notify of potential overages and provide feedback on which device to minimize or modify usage of, whether the device is connected or non-connected.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

One potential alternative implementation may include a master resource allocation wherein network-connected devices can be associated with different individuals to allow allocation of costs across multiple customers. In this implementation, device usage can be tracked across multiple individuals or entities, allowing those individuals or entities to pay for specific device operations. When coordinating among those individuals or entities, the master resource allocation can be used to manage relatively balanced spending across the group. Additionally, non-connected device costs may be included in the master resource allocation to offset device-based spending. For example, roommates or office coworkers may be assigned to or associated with different connected devices, as well as static or outside costs associated with the space such as rent. Using the master resource allocation, rules may be enforced such that spending is best equalized across the individuals or entities by suggesting operational modifications based, at least in part, on the relative spending of each of the customers. Additionally, if certain devices associated with a particular customer are used more than other devices, those portions of the resource allocation can be assigned to that customer.

In a second potential implementation, the master resource allocation can be associated with and thereby manage actions at two or more locations or spaces. Such instances may include a primary residence and a vacation home, where the master resource allocation is meant to cover usage of both locations. Because the vacation home may not be in use full-time, the resource allocation may be zero or near zero for the vacation home during non-vacation periods where no costs or few costs associated with the vacation home occur. During vacations, the master resource allocation can change (manually or automatically) to turn the primary residence to a reduced spending state while increasing the allocation related to the vacation home. This shifting of allocations may be done manually, or the shift may be automatic as the connected devices identify usage at the vacation home and not the primary residence.

The operational modifications described herein may be permanent or temporary modifications. In some instances, the modifications may last for the rest of the budgetary period in which they were made, unless additional changes and savings have occurred such that the temporary modifications can be removed and returned to the pre-modification level. In other instances, some of the modifications may be permanent until removed or changed by the customer. This can allow the customer to elect savings over the initial settings, thereby maintaining the savings over multiple budgetary periods. In some instances, different modifications may be seasonal in length—e.g., changes to the air conditioning in November can be reversed in May as temperatures rise. Further, the master resource allocation itself may seasonally adjust based on historical usage and/or current and upcoming weather forecasts. Similarly, the master resource allocation may be modified and/or adjusted based on any suitable inputs, including weather forecasts, calendaring and schedules, and/or commodity pricing, as appropriate.

The present solution can be applied not only in the residential space, but also in a commercial or landlord space as well. For multi-building commercial use, as well as for multi-tenant usage, the master resource allocation may include a primary overall resource allocation and a resident-and/or tenant-specific resource allocation. In other instances, each tenant or resident may be associated with their own master resource allocation, and common areas managed by the landlord or owner will be associated with a master resource allocation, with each person or entity maintaining rules and budgetary settings appropriate for their individual situation.

As described previously, some implementations may apply a more granular approach in managing a set of devices, including both connected and non-connected devices. Specifically, a device hub can be a connected or smart device providing load (e.g., electrical power, water, gas, etc.) to one or more devices, where the device hub acts as a load on the circuit, outlet, relay, or provider of said load. In these instances, the device hub can determine the loads associated with a plurality of directly associated devices, those that are network-connected, or connected devices, and those that are not, referred to as non-connected devices. The device hub may be, for example, a surge protector, power outlet, fluid source or relay, source circuit, or other suitable device, and may have access to or store information on the expected loads to be supplied to or used by the various connected and non-connected devices directly associated with the device hub. In some instances, the device hub not only can monitor the usage and actual loads provided to the devices, but may also be capable of providing instructions to modify operations of one or more of the connected devices in response to a determination that one or more of the actual loads provided to a particular device (or devices) is outside the expected loads that or those devices are expected to use. In such instances, the actual consumed resources may be higher than or will not possibly be higher than a normal resource allocation. In those instances, the device hub (or another suitable component receiving the load information from the device hub) can determine at least one operational modification to one of the connected devices to compensate for the overage of consumed resources. In doing so, the device hub can manage the more granular set of devices associated with the device hub as a circuit or load provider.

FIG. 7 illustrates an example block diagram of a simple system including a smart device hub 702 monitoring loads associated with at least one connected device 740 and at least one non-connected device 750. As described above, the device hub 702 may also be associated with, provide, or otherwise relay a load to the one or more devices 740, 750. In the present illustration, the device hub 702 may be considered a connection to a power source, such as an intelligent surge protector. The devices 740, 750 may be plugged into the other connected to the device hub 702, such that the device hub 702 can determine the load, or consumed resources, delivered to the devices 740, 750. In other instances, water and/or gas, as well as other resources, may be delivered via the device hub 702 or a source connected or associated with the device hub 702.

The device hub 702 includes an interface 704, processor 706, and GUI 708, which may be similar to the interface 104, processor 106, and GUI 108 of the device hub 102 of FIG. 1. The interface 704 can, generally, allow the device hub 702 to connect with one or more systems or components via network 730. Network 730 may be similar to network 150 as described in FIG. 1, and can allow the device hub 702 to connect to the one or more connected devices 740, among other systems.

The hub application 710 may be similar to hub application 110 of FIG. 1, in that the hub application 710 is capable of managing the resource allocation 720 associated with the devices 740, 750 connected to the device hub 702, allowing the amount of load or resources consumed by the various devices 740, 750 to be compared to the resource allocation 720 to determine if the resources consumed exceed the expected amounts. The usage analysis module 712 can perform the load and/or consumed resources monitoring, relaying the information to the allocation analysis module 714, which can determine whether the resource usage exceeds the amounts expected for the associated devices 740, 750. In the current illustration, the load and resources being monitored are the electrical power consumptions associated with the various devices 740, 750. Other implementations can monitor different load types other than electrical power consumption.

The device management module 716 can be used to determine one or more operational modifications to particular connected devices, particularly where a monitored resource usage amount exceeds the expected resource usage amount (e.g., as defined by the resource allocation 720). The device management module 716, upon receiving notification by the allocation analysis module 714 that the usage exceeds the expected usage, can identify the device information 722 and device management rules 724 (both stored in memory 718, similar to memory 118) relevant to the situation.

The set of device information 722 can store information relevant to the various devices associated with the device hub 702, both connected 740 and non-connected 750. For connected devices 740, the set of device information 722 can include or store connection information to each of the connected devices 740, such as particular device APIs or addresses at which instructions and messages can be sent back to the connected devices 740. The device information 722 can also include information on the devices 740, 750 themselves, and/or specific information related to the operation of and/or unique features or each device 740, 750. The expected amounts of resources to be used by particular devices 740, 750 may be defined in the resource allocation 720, which may include information related only to the subset of devices 740, 750 connected to the device hub 702.

The device management rules 724, similar to the device management rules 124, can represent a set of logic-based rules for maintaining the resource allocation 720 for the devices 740, 750 associated with the device hub 702. The device management rules 724 may be a default set of rules or a customized rule set. The rules may prioritize device usage and/or operations, providing various alternatives, modifications, and permutations of operations to be performed by the connected devices 740 in response to particular resource usages monitored by the usage analysis module 712. Because the device hub 702 may be unable to directly influence the operations of the one or more non-connected devices 750, the device management rules 724 may be used to reduce resource usage in one or more connected devices 740 in response to a non-connected device 750 using more than its expected load or resource as defined in the resource allocation 720. For example, where a non-connected lamp is left on overnight unexpectedly and exceeds its expected daily resource allocation, the device management rules 724 may be used to determine one or more of the connected devices 740 whose operations should be modified. In situations where particular connected devices 740 represent a lower priority set of operations than other connected devices 740, the device management module 716 may determine that one or more operational modifications to those lower priority devices 740 should be made. For example, if a smart thermostat is also connected to the device hub 702 as a connected device 740, the device hub 702 may determine that the temperature setting of the thermostat should be changed to reduce power consumption to offset the overuse of the non-connected lamp. Such changes can allow granular monitoring and operational management of the connected devices 740 in response to excessive usage by one or more non-connected devices 750. Similar operational modifications can also be performed by the device hub 702 in response to overages caused by excessive or unexpected usage by one of the connected devices 740 as well.

As illustrated, each connected device 740 may include an interface 742 for communicating with the device hub 702 and other components via network 730, a processor 744 for performing the operations of the device, and an operation module 746 (similar to operation module 136) executed by the processor 744 and defining the operations of the connected device 740. The device hub 702 can communicate and transmit instructions to the connected device 740 via network 730 on how any such operations should be modified, where appropriate. In addition to monitoring the resources consumed by the connected device 740 at the device hub 702, the connected device 740 may provide, in some cases, at least some usage information from its own calculations and determinations back to the device hub 702.

Each non-connected device 750 represents a device that cannot be modified directly by the device hub 702 via transmitted instructions from the device hub 702 to the non-connected device 750. In some instances, the device hub 702 may be able to shut off or restrict the load to be provided to the non-connected device 750, but the operational parameters of the non-connected devices 750 as set by the non-connected devices 750 themselves cannot be modified by the device hub 702. As illustrated, the non-connected devices 750 may include a processor 752 for executing the functionality of the non-connected devices 750, along with an operation module 754 representing one or more applications or operations defining the operations to be performed by the non-connected device 750. The operation module 754 can define a set of operating instructions to perform the standard operations of the non-connected device 750 which cannot be directly affected by the device hub 702. As illustrated, both the connected devices 740 and the non-connected devices 750 are plugged into the device hub 702 and use the device hub 702 as a conduit to a power source. By allowing the device hub 702 or a connected device 750 to act as a load on the system, the throughput can be tracked on a particular circuit. This information, in conjunction with the individual draw from each connected device, allows for the device hub 702 to calculate the overall circuit load (i.e., the load of non-connected devices).

FIG. 8 is a flowchart of an example operation 800 for using a connected controller to monitor resource usage of both connected and non-connected devices, and, in response to identifying resource usage exceeding an expected amount for a non-connected device, adjusting operations of at least one connected device. For clarity of presentation, the description that follows generally describes method 800 in the context of the system 700 illustrated in FIG. 7. However, it will be understood that method 800 may be performed, for example, by any other suitable system, environment, software, and hardware, or a combination of systems, environments, software, and hardware as appropriate.

At 805, a resource allocation associated with a set of connected and non-connected devices associated with a device hub is identified. The resource allocation may define an expected usage of resources or load used by the devices associated with the device hub. The device hub, in this instance, may be a load provider or source of the resource, or alternatively may be a conduit or relay associated with the resource. The resource may include, but is not limited to, electrical power (e.g., a surge protector, smart electric meter, uninterrupted power supply (UPS), etc.), water, or gas. In some instances, the resource may be bandwidth associated with a broadband or other network or communication connection. The connected devices may be devices which can be directly controlled or have their operations modified via instructions from the device hub, while non-connected devices may not be directly controlled nor have their operations modified via instructions. The resource allocation may be a portion of a larger resource allocation estimating resource usage across a larger system, such that resource allocation monitored by the device hub represents only the estimated usage for the devices associated with the device hub.

At 810, the load and/or resource usage associated with each of the connected and non-connected devices are monitored at the device hub. In some instances, the usage of the connected devices may be available from the connected devices themselves. In some instances, the resource usage associated with the non-connected devices may not be individually identifiable, but may instead be identified by a load or resource usage not associated with the set of connected devices.

At 815, the monitored load and/or resource usage is compared to the expected loads and/or resource usage as defined in the identified resource allocation. At 820, a determination is made as to whether an overage is identified by the comparison. If no overage is identified, method 800 returns to 810 and the loads and/or resource usage is continued to be monitored. If, however, an overage is identified, method 800 continues at 825, where a determination is made as to whether a connected device is responsible for the identified overage. If so, method 800 continues at 830, where the overage can be addressed with one or more of the connected devices. In some instances, the operations associated with such addressing may be similar to those described in method 300 of FIG. 3. That is, the operations of another connected device are modified to reduce the load/resource usage of that connected device based on the overages by the identified connected device. If, however, the overage is not associated with a connected device, method 800 continues at 835.

At 835, a required reduction in the load and/or resource usage to return the overall load/resource usage to the expected levels of the resource allocation is determined. This required reduction may be determined based on the amount of the identified overage determined by the comparison of 815. In some instances, additional calculations to determine the reduction needed may be performed.

At 840, at least one modification to the operations of at least one connected device may be determined, where those modifications are sufficient to meet the required reduction in load and/or resource usage. The modifications can include reducing a usage time of a particular connected device, changing a time of usage, modifying the operational parameters of the particular connected device, or other suitable operational modifications.

At 845, the device hub then transmits, to the connected device associated with the determined modification, instructions to perform the at least one modification as determined at 840. The connected device can then automatically perform the modification to modify the load and/or resource usage required by that connected device, thereby balancing the actual load and/or resource usage for each of the devices associated with the device hub to the amounts expected in the resource allocation. In some instances, a confirmation from the connected device receiving the transmitted instructions may be received. Once the instructions are transmitted, method 800 can return to 810, where the loads and/or resource usage of the connected and non-connected devices is monitored. If the changes to the operations of the connected device do not alleviate the overage in full, additional modifications to the same connected device or to one of the other connected devices may be performed.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A device hub, the device hub managing a resource allocation associated with a plurality of devices including one or more connected devices and one or more non-connected devices, wherein the device hub communicates with and manages operations of the one or more connected devices via a network connection, wherein the device hub comprises a conduit to a power source, wherein the one or more connected devices and the one or more non-connected devices are plugged into the device hub, the device hub comprising:
    a memory;
    at least one hardware processor interoperably coupled with the memory and configured to:
        identify the resource allocation associated with the device hub and the one or more connected devices and the one or more non-connected devices, the resource allocation defining an expected resource usage associated with a combination of the one or more connected devices and the one or more non-connected devices, wherein operations of each of the one or more connected devices can be modified via instructions transmitted by the device hub, wherein operations of each of the one or more non-connected devices cannot be modified via instructions transmitted by the device hub, wherein the device hub can shut off or restrict power to be provided to a non-connected device of the one or more non-connected devices;
        monitor first resource usage associated with the one or more connected devices at the device hub;
        calculate, at the device hub, second resource usage associated with the one or more non-connected devices based on a difference between a total resource usage identified by the device hub and the first resource usage associated with the one or more connected devices;
        compare, at the device hub, the first resource usage associated with the one or more connected devices and the second resource usage associated with the one or more non-connected devices, to the resource allocation; and
        in response to the comparison and a determination that the second resource usage associated with the one or more non-connected devices exceeded the resource allocation for the one or more non-connected devices:
            calculate, at the device hub, a first adjustment in operation for at least one connected device of the one or more connected devices associated with the device hub, the first adjustment in operation calculated based on a set of priority device usage rules;
            transmit, at the device hub, a first instruction from the device hub to the at least one connected device to perform the first adjustment in operation, wherein the first instruction causes the at least one connected device to automatically modify operations of the at least one connected device based on the first adjustment in operation;
            receive, at the device hub, a receipt confirmation from the at least one connected device;
            identify at least one non-connected device among the one or more non-connected devices, wherein the at least one non-connected device is identified based on usage profiles that identify one or more distinctive types of usage of the one or more non-connected devices;
            identify one or more recommended actions associated with the at least one non-connected device, wherein the one or more recommended actions comprise replacing the at least one non-connected device with a connected device;
            communicate the one or more recommended actions to a user.

2. The device hub of claim 1, wherein the device hub is a relay for, a provider of, or gateway to a resource.

3. The device hub of claim 1, wherein the resource comprises electric power.

4. The device hub of claim 1, wherein the first instruction to perform the first adjustment in operation is performed at the at least one connected device automatically without intervention from another party.

5. The device hub of claim 1, wherein calculating the first adjustment in operation for the at least one connected device associated with the device hub includes:
    determining a reduction in resource usage required to reduce the total resource usage to the expected resource usage included in the resource allocation; and
    determining at least one adjustment operable to cause a change in the total resource usage equal to or exceeding the determined reduction.

6. The device hub of claim 1, wherein the first adjustment in operation comprises adjustments in operations for two or more connected devices.

7. The device hub of claim 1, wherein the resource allocation comprises a subset of a master resource allocation associated with an ecosystem of connected and non-connected devices.

8. The device hub of claim 1, wherein in response to the comparison and a determination that the first resource usage associated with the one or more connected devices has an overage as compared to the resource allocation for the one or more connected devices, the at least one hardware processor further configured to calculate a second adjustment in operation for the one or more connected devices associated with the overage.

9. The device hub of claim 1, wherein the one or more recommended actions comprise reducing usage of the at least one non-connected device.

10. The device hub of claim 1, wherein the one or more recommended actions comprise changing a time of usage for the at least one non-connected device.

11. The device hub of claim 1, wherein the one or more recommended actions comprise replacing the at least one non-connected device with, a more efficient connected or non-connected device than the at least one non-connected device.

12. A computerized method performed by one or more processor of a device hub, the device hub managing a resource allocation associated with a plurality of devices including devices one or more connected devices and one or more non-connected devices, wherein the device hub communicates with and manages operations of the one or more connected devices via a network connection, and wherein the device hub comprises a conduit to a power source, wherein the one or more connected devices and the one or more non-connected devices are plugged into the device hub, the method comprising:

identifying, by the device hub, the resource allocation associated with the device hub, the resource allocation defining an expected resource usage associated with a combination of the one or more connected devices and the one or more non-connected devices, wherein operations of each of the one or more connected devices can be modified via instructions transmitted by the device hub, wherein operations of each of the one or more non-connected devices cannot be modified via instructions transmitted by the device hub, wherein the device hub can shut off or restrict power to be provided to a non-connected device of the one or more non-connected devices;

monitoring, by the device hub, first resource usage associated with the one or more connected devices;

calculating, by the device hub, second resource usage associated with the one or more non-connected devices based on a difference between a total resource usage identified by the device hub and the first resource usage associated with the one or more connected devices;

comparing, by the device hub, the first resource usage associated with the one or more connected devices and the second resource usage associated with the one or more non-connected devices, to the resource allocation; and in response to the comparison and a determination that the second resource usage associated with the one or more non-connected devices exceeded the resource allocation for the one or more non-connected devices:

calculating, by the device hub, a first adjustment in operation for at least one connected device of the one or more connected devices associated with the device hub, the first adjustment in operation calculated based on a set of priority device usage rules;

transmitting, by the device hub, a first instruction from the device hub to the at least one connected device to perform the first adjustment in operation, wherein the first instruction causes the at least one connected device to automatically modify operations of the at least one connected device based on the first adjustment in operation;

receiving, at the device hub, a receipt confirmation from the at least one connected device;

identifying at least one non-connected device among the one or more non-connected devices, wherein the at least one non-connected device is identified based on usage profiles that identify one or more distinctive types of usage of the one or more non-connected devices; and identifying one or more recommended actions associated with the at least one non-connected device, wherein the one or more recommended actions comprise replacing the at least one non-connected device with a connected device;

communicate the one or more recommended actions to a user.

13. The method of claim 12, wherein the device hub is a relay for, a provider of, or gateway to a resource.

14. The method of claim 12, wherein the resource comprises electric power.

15. The method of claim 12, wherein the first instruction to perform the first adjustment in operation is performed at the at least one connected device automatically without intervention from another party.

16. The method of claim 12, wherein calculating the first adjustment in operation for the at least connected device associated with the device hub includes:

determining a reduction in resource usage required to reduce the total resource usage to the expected resource usage included in the resource allocation; and determining at least one adjustment operable to cause a change in the total resource usage equal to or exceeding the determined reduction.

17. The method of claim 12, wherein the first adjustment in operation comprises adjustments in operations for two or more connected devices.

18. A non-transitory, computer-readable medium storing computer-readable instructions executable by a computer and configured to:

identify, at a device hub, a resource allocation associated with the device hub, the device hub managing the resource allocation associated with a plurality of devices including one or more connected devices and one or more non-connected devices, wherein the device hub communicates with and manages operations of the one or more connected devices via a network connection, and wherein the device hub comprises a conduit to a power source, wherein the one or more connected devices and the one or more non-connected devices are plugged into the device hub, the resource allocation defining an expected resource usage associated with a combination of the one or more connected devices and the one or more non-connected devices, wherein operations of each of the one or more connected devices can be modified via instructions transmitted by the device hub, wherein operations of each of the one or more non-connected devices cannot be modified via instructions transmitted by the device hub, wherein the device hub can shut off or restrict power to be provided to a non-connected device of the one or more non-connected devices;

monitor, at the device hub first resource usage associated with the one or more connected devices;

calculate, at the device hub, second resource usage associated with the one or more non-connected devices based on a difference between a total resource usage identified by the device hub and the first resource usage associated with the one or more connected devices;

compare, at the device hub, the first resource usage associated with the one or more connected devices and the second resource usage associated with the one or more non-connected devices, to the resource allocation; and in response to the comparison and a determination that the second resource usage associated with the one or more non-connected devices exceeded the resource allocation for the one or more non-connected devices:

calculate, at the device hub, a first adjustment in operation for at least one connected device of the one or more connected devices associated with the device hub, the first adjustment in operation calculated based on a set of priority device usage rules;

transmit, at the device hub, a first instruction from the device hub to the at least one connected device to perform the first adjustment in operation, wherein the first instruction causes the at least one connected device to automatically modify operations of the at least one connected device based on the first adjustment in operation;

receive, at the device hub, a receipt confirmation from the at least one connected device;

identify at least one non-connected device among the one or more non-connected devices, wherein the at least one non-connected device is identified based on usage profiles that identify one or more distinctive types of usage of the one or more non-connected devices;

identify one or more recommended actions associated with the at least one non-connected device, wherein the one or more recommended actions comprise replacing the at least one non-connected device with a connected device;

communicate the one or more recommended actions to a user.

19. The non-transitory computer-readable medium of claim 18, wherein calculating the first adjustment in operation for the at least one connected device associated with the device hub includes:

determining a reduction in resource usage required to reduce the total resource usage to the expected resource usage included in the resource allocation; and determining at least one adjustment operable to cause a change in the total resource usage equal to or exceeding the determined reduction.

* * * * *

UNITED STATES PATENT AND TRADEMARK OFFICE
CERTIFICATE OF CORRECTION

PATENT NO. : 10,938,700 B2  
APPLICATION NO. : 15/152297  
DATED : March 2, 2021  
INVENTOR(S) : Evan Cohen et al.

Page 1 of 1

It is certified that error appears in the above-identified patent and that said Letters Patent is hereby corrected as shown below:

In the Claims

In Column 30, Line 52, Claim 18, please replace "hub" with -- hub, --.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*